United States Patent
Cui et al.

(10) Patent No.: US 12,327,116 B1
(45) Date of Patent: Jun. 10, 2025

(54) PROCESSOR FOR CONFIGURABLE PARALLEL COMPUTATIONS

(71) Applicant: STAR ALLY INTERNATIONAL LIMITED, Tortola (VG)

(72) Inventors: Zhaoxiong Cui, Fremont, CA (US); Wensheng Hua, Fremont, CA (US)

(73) Assignee: STAR ALLY INTERNATIONAL LIMITED, Tortola (VG)

( * ) Notice: Subject to any disclaimer, the term of this patent is extended or adjusted under 35 U.S.C. 154(b) by 12 days.

(21) Appl. No.: 18/522,822

(22) Filed: Nov. 29, 2023

(51) Int. Cl.
    *G06F 15/80* (2006.01)
    *G06F 9/30* (2018.01)

(52) U.S. Cl.
    CPC ........ *G06F 9/3001* (2013.01); *G06F 9/30065* (2013.01)

(58) Field of Classification Search
    CPC .... G06F 9/448; G06F 9/4498; G06F 15/8023; G06F 15/8046; G06F 15/825
    See application file for complete search history.

(56) References Cited

U.S. PATENT DOCUMENTS

| | | | | |
|---|---|---|---|---|
| 7,814,298 | B1* | 10/2010 | Thaik | G06F 12/0875 712/207 |
| 10,915,297 | B1* | 2/2021 | Halutz | G06F 17/153 |
| 2012/0303932 | A1* | 11/2012 | Farabet | G06N 3/045 712/30 |
| 2017/0083313 | A1* | 3/2017 | Sankaralingam | G06F 15/7867 |
| 2018/0267932 | A1* | 9/2018 | Zhu | G06F 9/3001 |
| 2019/0303153 | A1* | 10/2019 | Halpern | G06F 15/7825 |
| 2021/0200710 | A1* | 7/2021 | Hua | G06F 15/7889 |
| 2022/0129521 | A1* | 4/2022 | Surti | G06F 12/0804 |

* cited by examiner

Primary Examiner — Jacob Petranek
(74) Attorney, Agent, or Firm — Edward C. Kwok; VLP Law Group LLP

(57) ABSTRACT

A programmable data processor includes multiple numerous programmable pipeline circuits each including numerous arithmetic and logic operator circuits that can be configured into an execution pipeline that can be controlled according to a state machine. Each programmable pipeline circuit also includes numerous building block circuits that can configured into a sequencer for the state machine. The building block circuits may include (i) state elements for representing a state in the state machine, and (ii) loop elements for representing a loop in the state machine.

21 Claims, 16 Drawing Sheets

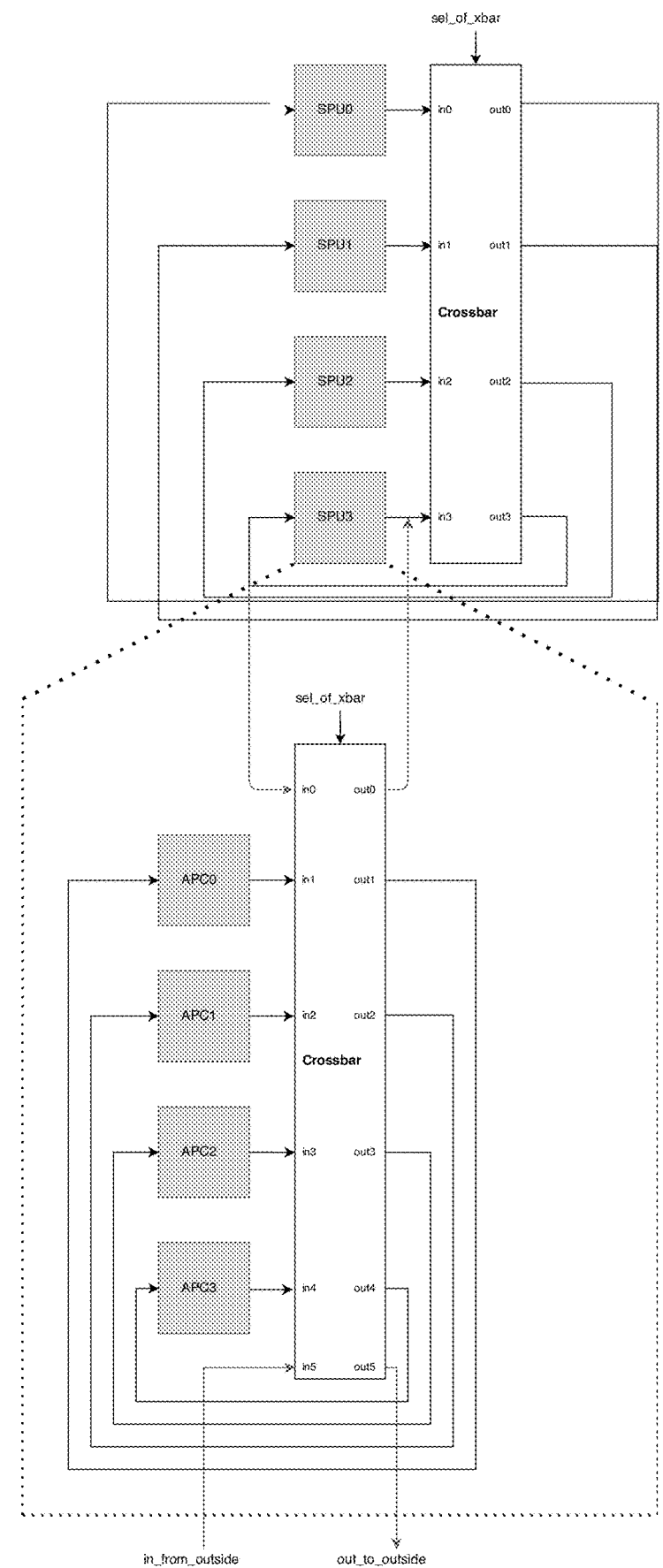
Fig. 1-C1

PROCESSOR FOR CONFIGURABLE PARALLEL COMPUTATIONS

CROSS REFERENCE TO RELATED APPLICATIONS

The present application is related to U.S. patent application ("Related Application"), Ser. No. 18/367,344, entitled "Processor for Configurable Parallel Computations," filed on Sep. 12, 2023, which is a continuation application of U.S. patent application Ser. No. 17/132,437, entitled "Processor for Configurable Parallel Computations," filed on Dec. 23, 2020, which is related to and claims priority of U.S. provisional application ("Provisional Application"), Ser. No. 62/954,952, entitled "Processor For Configurable Parallel Computations," filed on Dec. 30, 2019. The disclosure of the Related Application and the Provisional Application are hereby incorporated by reference herein in their entireties.

BACKGROUND OF THE INVENTION

1. Field of the Invention

The present invention relates to processor architecture. In particular, the present invention relates to architecture of a processor having numerous processing units and data paths that are configurable and reconfigurable to allow parallel computing and data forwarding operations to be carried out in the processing units.

2. Discussion of the Related Art

Many applications (e.g., signal processing, navigation, matrix inversion, machine learning, large data set searches) require enormous amount of repetitive computation steps that are best carried out by numerous processors operating in parallel. Current microprocessors, whether the conventional "central processing units" (CPUs) that power desktop or mobile computers, or the more numerically oriented conventional "graphics processing units" (GPUs), are suited for such tasks. A CPU or GPU, even if provided numerous cores, are inflexible in their hardware configurations. For example, signal processing applications often require sets of large number of repetitive floating-point arithmetic operations (e.g., add and multiply). As implemented in a conventional CPU or GPU, the operations of a single computational unit may be implemented as a series of add, multiply and compare instructions, with each instruction being required to fetch operands from registers or memory, perform the operation in an arithmetic-logic unit (ALU), and write back the result or results of the operations back to registers or memory, Although the nature of such operations are well-known, the set of instructions, or the execution sequence of instructions, may vary with data or the application. Thus, because of the manner in which memory, register files and ALUs are organized in a conventional CPU or GPU, it is difficult to achieve a high-degree of parallel processing and streamlining of data flow without the flexibility of reconfiguring the data paths that shuttle operands between memory, register files and ALUs. In many applications, as these operations may be repeated hundreds of millions of times, enormous efficiencies can be attained in a processor with an appropriate architecture.

SUMMARY

According to one embodiment of the present invention, a programmable data processor includes multiple stream processors that are interconnected by a set of first-level programmable interconnection elements. Each stream processor may include (a) numerous programmable pipeline circuits each including: (1) numerous arithmetic and logic operator circuits, each arithmetic or logic circuit being configured to carry out a selected one of a number of predetermined arithmetic or logic functions on a set of one or more operands to provide a set of one or more results; (2) numerous second-level programmable interconnection elements, configurable to connect a selected group of the arithmetic and logic operator circuits to form an execution pipeline in which the set of results of a first member of the selected group is provided as part of the set of operands of a second member of the selected group, wherein operations in the execution pipeline are controlled according to a state machine; and (3) numerous building block circuits connectable to each other using the second-level programmable interconnection elements, thereby a collection of the building block circuits to be configurable into a sequencer for the state machine, the building blocks including (i) state elements, each configurable for representing a state in the state machine, and (ii) loop elements, each configurable for representing a loop in the state machine, wherein (i) each state element keeps track of a programmable duration for which the sequencer is to remain in the state represented by the state element, and (ii) each loop element keeps track of a number of iterations for which the sequencer is to traverse the loop represented by the loop element; and (b) a control circuit that initiates an operation of the sequencer.

According to one embodiment of the present invention, the programmable data further includes a barrier controller circuit for providing a synchronizing signal to allow the control circuit of a first one of the programmable pipeline circuits and the control circuit of a second one of the programmable pipeline circuits to initiate operations of their respective sequencers simultaneously. In one embodiment, both the first one of the programmable pipeline circuits and the second one of the programmable pipeline circuits are part of the same one of the stream processors. In another embodiment, the first one of the programmable pipeline circuits is part of a first one of the stream processors, and the second one of the programmable pipeline circuits is part of a second one of the stream processors.

According to one embodiment of the present invention, the barrier controller implements a number of barriers, each barrier is associated with a predetermined number of devices that are allowed to wait on the barrier.

According to one embodiment of the present invention, the programmable data processor provides a periodic timing signal which serve the stream processors. The predetermined duration in each state element may be specified by a number of cycles in the periodic timing signal. Each programmable pipeline circuit may include a gating circuit for the timing signal, the gating circuit selectively enabling and disabling propagation of the timing signal among the programmable arithmetic or logic operator circuits.

In some embodiments, each programmable pipeline circuit may include registers for storing the operands and the results. In some embodiments, the programmable pipeline circuit may include a memory circuit that can also be used for storing the operands and the results. The controller circuit of each programmable pipeline circuit may execute a program stored in the memory circuit. The programs of each controller each may be formed out of instructions of a common instruction set.

According to one embodiment of the present invention, the execution pipeline of a first one of the programmable pipeline circuits in a stream processor may be connected to the execution pipeline of a second one of programmable pipeline circuits of the same stream processor or of another stream processing using both the first-level and the second-level interconnection elements, if necessary.

The programmable data processor of the present invention may include an interface with an external host processor, and a first set of configuration registers accessible to the external host processor, to allow the external host processor to configure the execution pipeline in each programmable pipeline circuit in the programmable data processor. A second set of configuration registers accessible to the external host processor may be provided to allow the external host processor to configure the stream processors in the programmable data processor.

The present invention is better understood upon consideration of the detailed description below with the accompanying drawings.

BRIEF DESCRIPTION OF THE DRAWINGS

FIG. 1C-1 illustrates interconnection fabric 16 interconnecting SPUs 14-1 to 14-4 and interconnection fabric 26 of SPU 14-4 interconnecting APCs 24-1 to 24-4, interconnecting fabric 16 and the external interfaces.

FIGS. 1C-2 and 1C-3 illustrate in look-up table files 18 and 28 in SPU module 13 and APC module 23, respectively, storing a configuration into a selected look-up table and recalling a configuration from a selected look-up table.

FIG. 1-D is an architectural block diagram of APC module 48 (e.g., any of APC 24-1 to 24-4 of FIG. 1B), in accordance with one embodiment of the present invention.

FIG. 1F-1 illustrates a functional description of a building block iterator circuit 90 (also referred to as "1-Dimensional (1-D) iterator" circuit 90), in accordance with one embodiment of the present invention.

FIG. 1F-2 shows chaining two 1-D iterator circuits 90-1 and 90-2, according to one embodiment of the present invention.

To facilitate cross-referencing between figures, like elements in the figures are provided like reference numerals.

DETAILED DESCRIPTION OF THE PREFERRED EMBODIMENTS

Figure 1A:
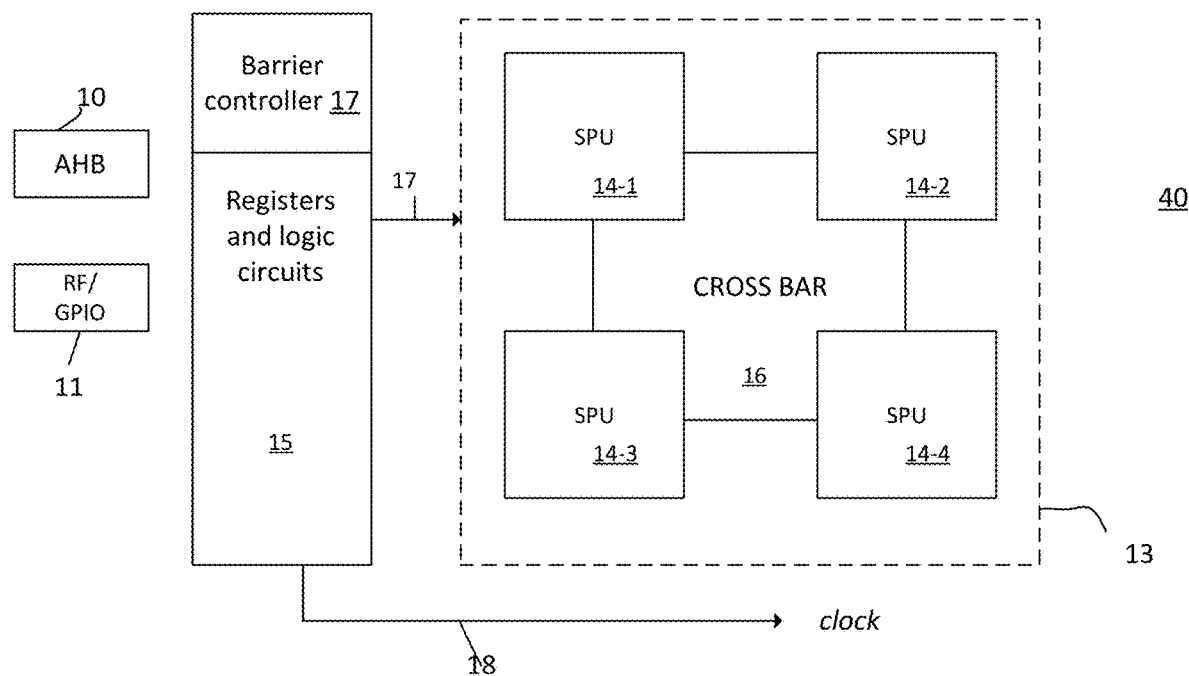
FIG. 1A is an architectural block diagram of processor 40, which is suitable for use, for example, as a baseband processor for a signal processing application (e.g., a GPS receiver), according to one embodiment of the present invention.

According to one embodiment of the present invention, FIG. 1A is an architectural block diagram of processor 40 at its top-level. Processor 40 is suitable for use in implementing, for example, a baseband processor for a signal processing application (e.g., a GPS receiver). Processor 40 may implement, for example, a processor that works under control of an external host processor or controller over a standardized interface (e.g., Advanced High-Performance Bus (AHB)). The external processor may be provided, for example, by any suitable processor (e.g., an open standard instruction set architecture processor, such as an RISC-V processor), known to those of ordinary skill in the art. Therefore, as shown in FIG. 1A, processor 40 is provided AHB interface 10, and radio frequency (RF) signal and general-purpose input/output (GPIO) interface 11 to allow processor 40 to operate as a baseband processor for the signal processing application. In this configuration, process 40 may serve as an accelerator for processing a data stream coming from a digitized RF signal source (e.g., an "RF front-end"). The data stream may be data samples from an RF front-end with conventional analog down-conversion circuits and an analog-to-digital (A/D) converter. Thus, in this application, processor 40 may be seen as a customized AHB-Lite device that accelerates processing of data stream from an RF interface in a manner that is both specialized and localized.

At the top level of FIG. 1A, processor 40 further includes registers and logic circuits 15, and SPU module 13, which may include any number of stream processor units (SPUs)—illustrated in FIG. 1A, for example, by SPU 14-1, 14-2, 14-3 and 14-4. The SPUs are interconnected by interconnection fabric 16, which may be implemented by a Benes network, a full or partial cross-bar switch network, or any suitable interconnection network. In one embodiment, each SPU is provided 50-bit input and output data buses, which may connect to the 50-bit in and output data buses of another SPU over interconnection fabric 16. Thus, in that embodiment, interconnection fabric 16 may be implemented by a 4×4 cross-bar switch network.

For convenience of reference, the registers in registers and logic circuits 15 are also referred herein as "top-level registers." Processor 40 may be configured, for example, by the external host processor over AHB interface 10 writing into selected configuration registers in top-level registers 15. Thus, the external host processor may control operations of SPUs 101-1 to 101-4 and interconnection fabric 16. As discussed in further detail below, the external host processor may access local registers and memories in each SPUs over the same AHB interface 10.

A clock circuit, controllable through in top-level registers, provides a global timing signal ("clock") that serves as a time base for all data processing circuits in processor 40. As shown in FIG. 1A, processor 40 further includes barrier controller 17, described in further detail below, which provides a mechanism for synchronizing operations between data processing circuits (e.g., arithmetic pipeline complexes (APCs), described below in conjunction with FIG. 1B) within an SPU and across SPUs.

In one embodiment, each SPU may be implemented structurally identical—but individually configurable—to perform customized functions. For example, in one embodiment, SPU 14-1 and SPU 14-2 may be configured to receive digitized samples of an RF signal from phase and quadrature channels over RF and GPIO interface 11. Likewise, SPU 14-3 and SPU 14-4 may receive input data and may provide output data over input and output ports allocated on RF and GPIO interface 11. Over internal bus 17, SPUs 14-1 to 14-4 may each access top-level registers and logic circuits 15.

Figure 1B:
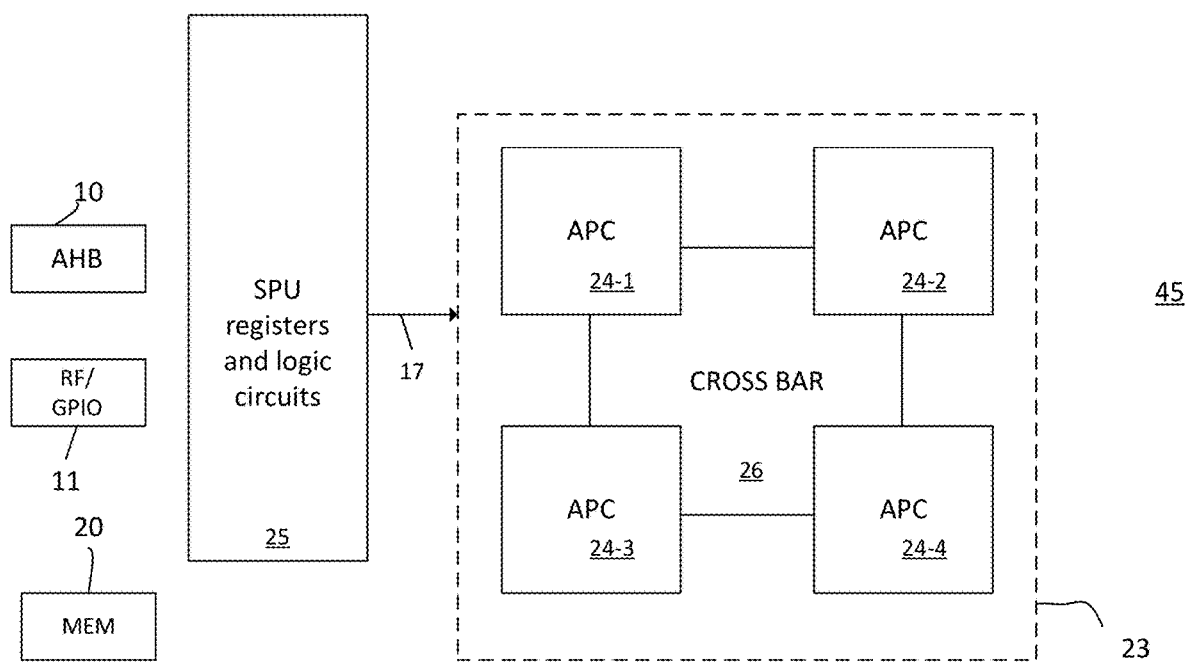
FIG. 1B is an architectural block diagram of SPU 45 (e.g., any of SPUs 14-1 to 14-4 of FIG. 1A), in accordance with one embodiment of the present invention.

FIG. 1B is an architectural block diagram of SPU 45 (e.g., any of SPUs 14-1 to 14-4 of FIG. 1A), in accordance with one embodiment of the present invention. As shown in FIG. 1B, each SPU further includes SPU registers and logic circuits 25 and APC module 23. APC module 23 may include any number of APCs (e.g., APC 24-1, 24-2, 24-3 and 24-4) which are shown in FIG. 1B as being interconnected by interconnection fabric 26. The registers in SPU registers and logic circuits 25 are also referred to as "SPU-level registers." As in the SPUs, the APCs may be implemented as structurally identical, but may each be individually configurable to perform customized functions. Interconnection fabric 26 of SPU 45 may be implemented by a Benes network, a full or partial cross-bar switch network, or any suitable interconnection network. Interconnection fabric 26 may form a portion of top-level interconnection fabric 16. Specifically, in one embodiment, interconnect fabric 26 of SPU 45 may present an input port and an output port to top-level interconnection fabric 16, thereby allowing interconnection fabric 26 of SPU 45 to interconnect any of the other SPUs in processor 40. In one embodiment, an additional input port and an additional output port may be provided at top-level interconnection fabric 16, which allow connections by any SPU in processor 40 to external interfaces. The external interfaces may be used, for example, to interconnect with another processor that is similarly configured as processor 40. In one embodiment, the external interfaces include AHB interface 10 and RF and GPIO interfaces 11.

SPU-level registers 25 may include configuration registers for configuring each of APC 24-1 to 24-4 and interconnection fabric 26. In one embodiment, APC 24-1 to 24-4 may access SPU-level registers 25 over internal bus 17. As discussed in further detail below, SPU 45 may include static random-access memory (SRAM) circuits (e.g., SRAM circuits in each of APC 14-1 to 14-4), that are accessible internally by each APC and accessible across SPUs over memory bus 20. As mentioned above, through its associated input and output ports to top-level interconnect fabric 16, interconnection fabric 26 of SPU 45 connects with other SPUs in processor 40. In addition, interconnection fabric 26 provides the additional input and output ports to allow SPU 45 to access or be accessed over the external interfaces (e.g., AHB interface 10 and RF and GPIO interfaces 11). Therefore, in one embodiment, with four APCs in each SPU to interconnect, interconnection fabric 26 may be implemented by a 6×6 cross-bar switch network.

Figures 1, 1C, 2:
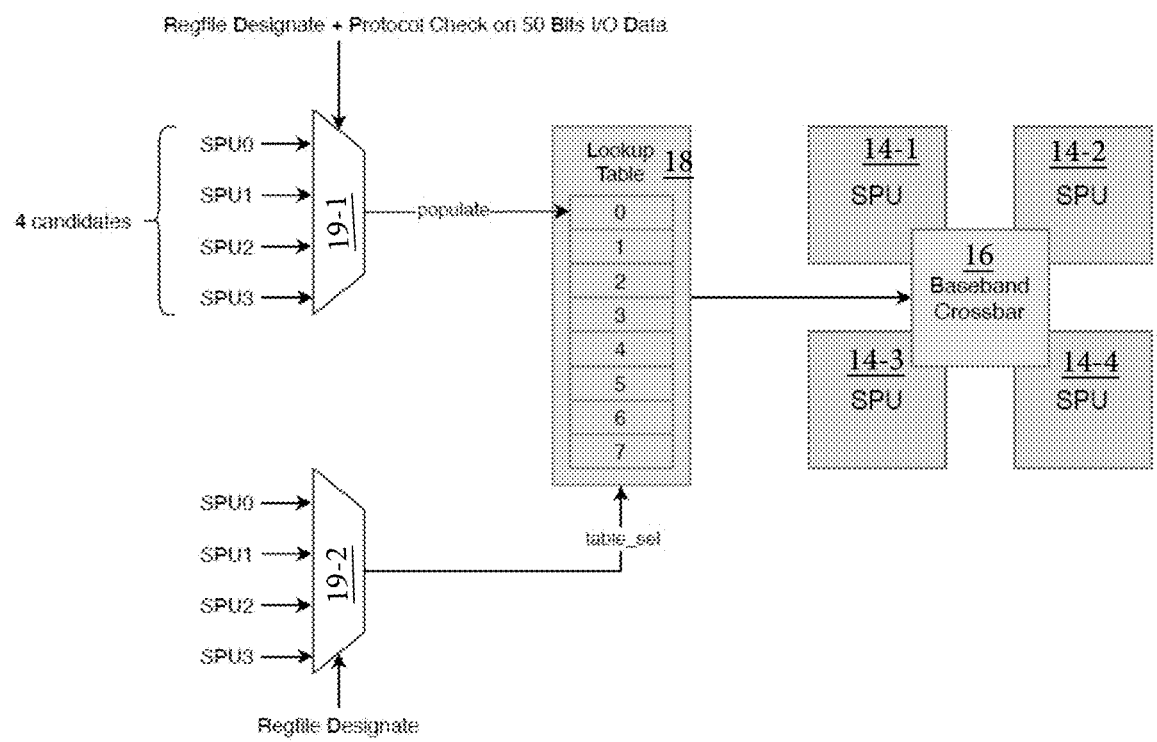
Figures 1, 1C, 2, 3:
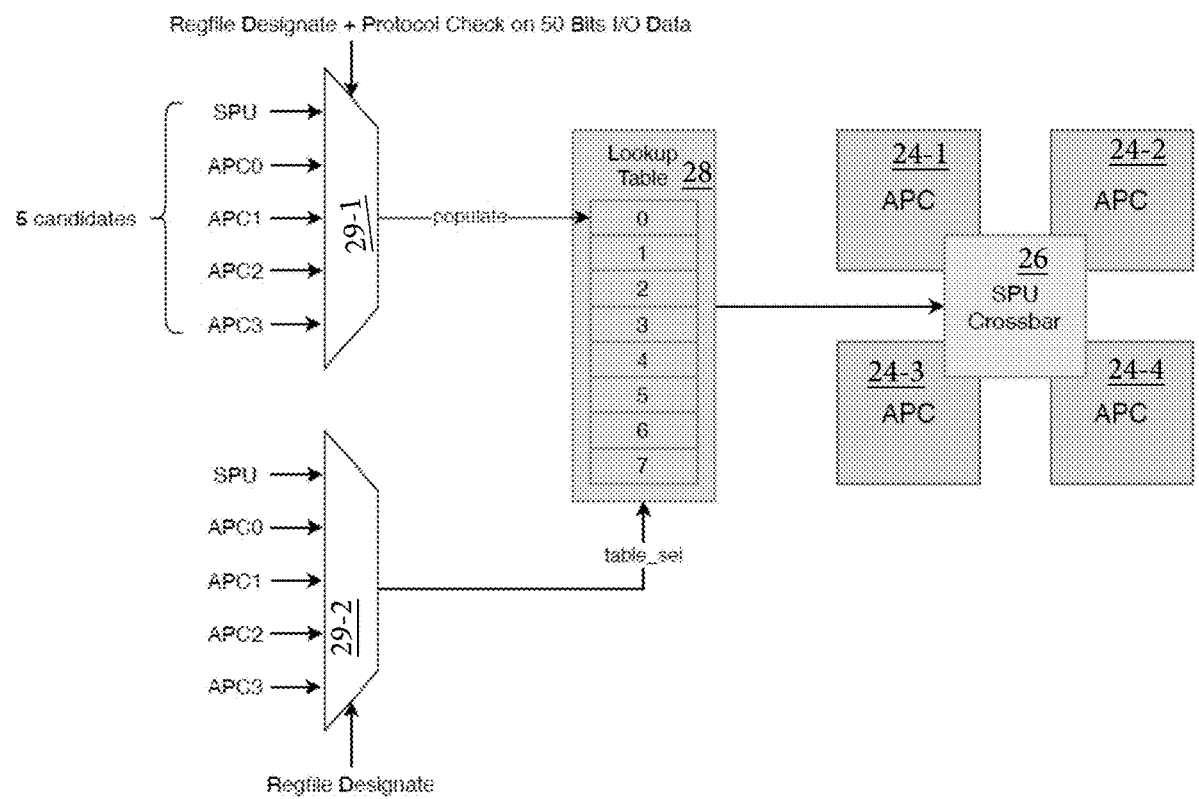
Figure 1D:
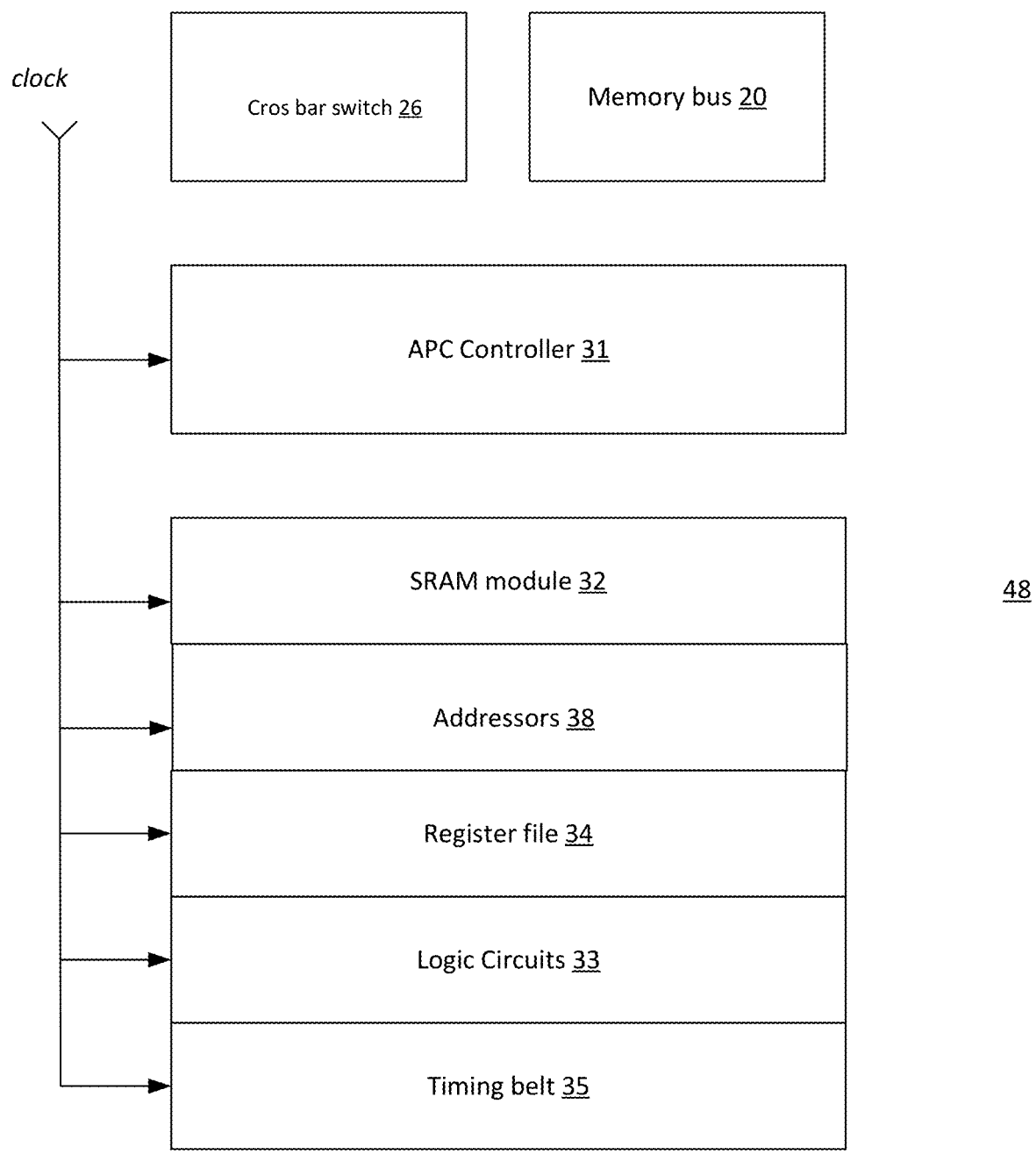

FIG. 1C-1 illustrates interconnection fabric 16 interconnecting SPUs 14-1 to 14-4 in SPU module 13, and interconnection fabric 26 of SPU 14-4 interconnecting APCs 24-1 to 24-4, interconnecting fabric 16 and the external interfaces in APC module 23. (Each of SPU 14-1 to 14-4 includes an APC module that is substantially identical to APC module 23.) As shown in FIG. 1C-1, in APC module 23, besides interconnecting APCs 24-1 to 24-4, interconnection fabric 26 includes also input port in0 and output port out0, which connect through its associated SPU—in this case of FIG. 1C-1, SPU 14-4-into interconnection fabric 16, thus with other SPUs at the baseband level (i.e., SPU module 13 of processor 40). Interconnection fabric 26 also includes input port in6 and output port out6, which allows interconnection fabric to access or be accessed by the external interfaces. In one module, the APC module of SPU 14-1 is coupled to one of two RF channels, the APC module of SPU 14=2 is coupled to the other one of the two RF channels, and the APC module of SPU 14-3 is coupled to designated GPIO terminals of processor 40.

Interconnection fabric 16 and interconnection fabric 26 may be dynamically reconfigured by the host processor or by any APC in any of the SPUs. To configure interconnection fabric 16 from the host processor, the configuration-which is specified in a 50-bit vector communicated over a system bus—is written into a configuration register in registers 15 of processor 40. To configure from an APC, however, the configuration is stored one of a predetermined number of look-up tables. FIGS. 1C-2 and 1C-3 illustrate in look-up table files 18 and 28 in SPU module 13 and APC module 23, respectively, storing a configuration into a selected look-up table and recalling a configuration from a selected look-up table.

As shown in FIG. 1C-1, to store a configuration into a look-up table, the host processor writes into register 15, which provides 2-bit control signal regfile designate to multiplexer 19-1 to select one of the connected SPUs. In this action, the selected SPU is granted access to place a 50-bit vector on the system bus. The 50-bit vector holds the configuration bits for interconnection fabric 16 in an 8-bit field and a 3-bit identity that specifies which look-up table in interconnection fabric 16 to store the configuration bits.

To dynamically configure interconnection fabric 16, control signal regfile designate causes multiplexer 19-2 to grant access to a selected one of the SPUs to place a 50-bit vector on the system bus. This 50-bit vector specifies one of look-up tables 18. The configuration bits in the selected look-up table are then loaded into and configures interconnection fabric 16. In this manner, interconnection fabric 16 is dynamically configured within one clock cycle without intervention by the external host device.

FIG. 1C-3 illustrates the storing of configuration bits into look-up tables 28 of each APC module (e.g., APC module 23) and the recalling of these configuration bits from look-up tables 28 to configure interconnection fabric 26 are analogous to those described in FIG. 1C-2 for interconnection fabric 16 of SPU module 13. As shown in FIG. 1C-3, interconnection fabric 28 may be configured from an SPU through interconnection fabric 16 and any of the APC within the SPU in which the APC module is provided.

FIG. 1-D is an architectural block diagram of APC module 48 (e.g., any of APC 24-1 to 24-4 of FIG. 1B), in accordance with one embodiment of the present invention. As shown in FIG. 1-D, APC 48 may be interconnected to other APCs over interconnection fabric 26, which may be implemented by a full or partial cross-bar switch network, as described above with respect to FIGS. 1C-1 to 1C-3. Data processing operations within each APC may be carried out by configurable logic circuits 33, which includes a collection of operators that may be optimized for a target application of processor 40. In this embodiment, APC module 48 includes two types of memory circuits: namely, SRAM module 32 and register file module 34 (also refer to as flop matrices 34). These memory circuits may be accessed for reading or writing by circuits in addressor module 38, which include circuitry for generating addresses for accessing specific data structures, such as multi-dimensional arrays or matrices. APC module 48 may further include timing belt module 35 (also described below) which provides a synchronization mechanism for coordinated data operations (e.g., "execution pipelines") across APCs.

In some embodiments, all APCs in processor 40 may have substantially identical architecture. Each APC may include a controller (i.e., APC controller 31 or "k-controller") that executes programs that control all operations of the APC. APC controller 31 may be implemented by any general-purpose processor, whether or not "Turing-complete", a proprietary processor or controller, any commercially available third-party processor or controller (e.g., RISC-V or ARM), or any suitable derivation of the above. For certain applications (e.g., signal processing applications), a controller with a minimal instruction set is preferred.

Figure 1E:
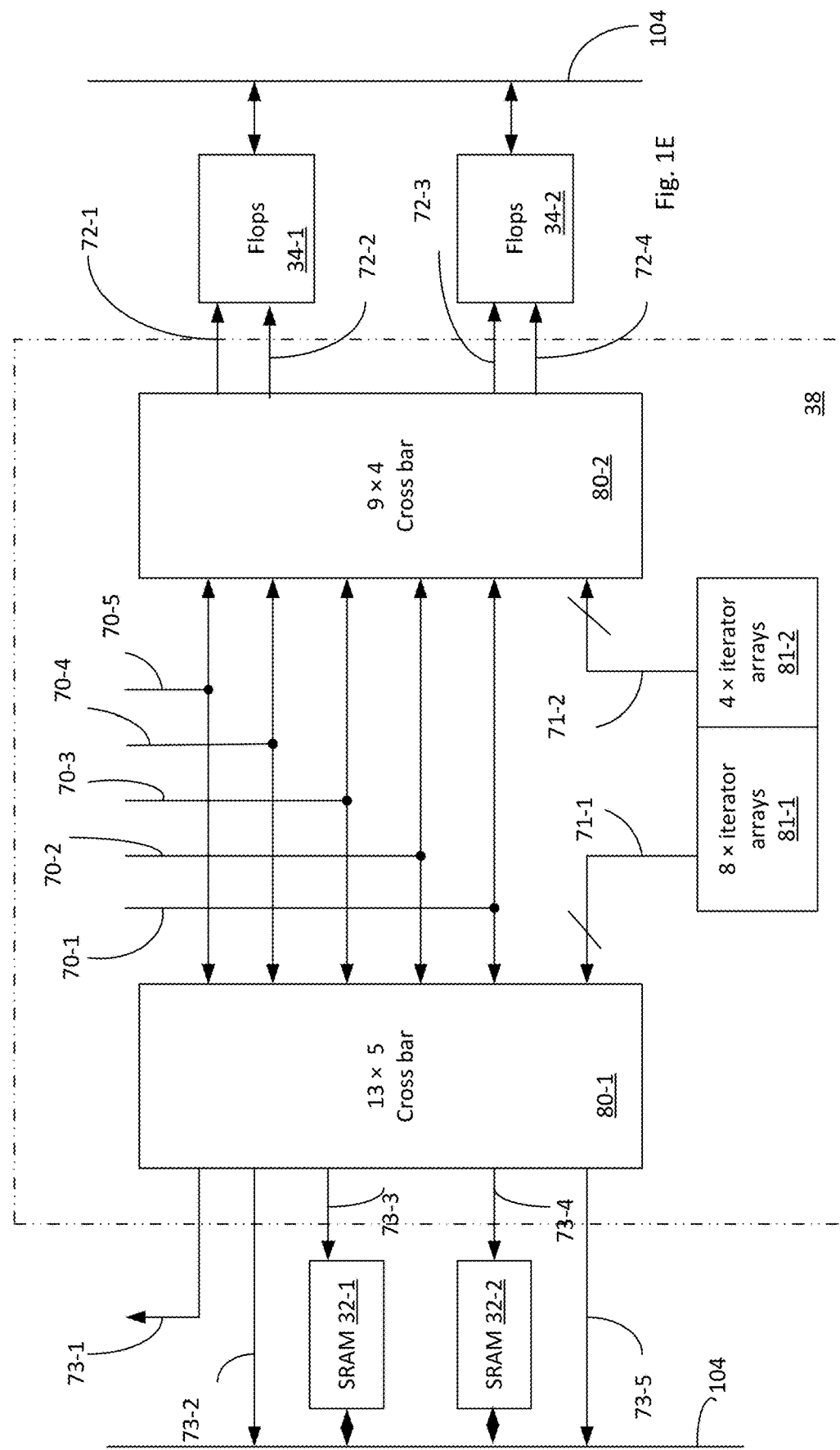
FIG. 1E illustrates one implementation of addressor module 38, according to one embodiment of the present invention.

As shown in FIG. 1-D, APC 48 includes addressor module 38, which is configurable to generate desired address sequences for accessing SRAM 32 and register file 34. A desired address sequence may be, for example, one that accesses a multi-dimensional array of data items, one data item at a time, in a predetermined order. FIG. 1E illustrates one implementation of addressor module 38, according to one embodiment of the present invention. As shown in FIG. 1E, addressor module 38 includes cross-bar switch networks 80-1 and 80-2, provided to support accessing SRAM module 32 and register file 34, respectively. In this embodiment, cross-bar switch network 80-1 may be a 13×5 cross-bar switch network, including 13 16-bit input ports and 5 16-bit output ports. Likewise, cross-bar switch network 80-2 may be a 9×5 cross-bar switch network, including 9 16-bit input ports and 5 16-bit output ports As shown in FIG. 1E, the input ports of cross-bar switch network 80-1 are: (a) constant 70-1, holding 16 bits of zero; (b) 16-bit bus portions 70-2 and 70-3, receiving the 16 most significant bits (MSBs) and the 16 least significant bits (LSBs) of a data bus, respectively; (c) 16-bit control bus 70-4; (d) 16-bit input port 70-5, receiving data over interconnection fabric 23 from another APC or SPU of processor 40; and (e) input ports 71-1, receiving 8 16-bit words from the 8 output ports of address iterator array 81-1. The structure and operations of address iterators are described in further detail below. The 16-bit bus portions 70-2 and 70-3 may be an internal data bus, which may also be part of global bus 104.

As shown in FIG. 1E, SRAM module 32 may be organized into independently addressable SRAM sections 32-1 and 32-2. The output ports of cross switch network 80-1 are: (a) 16-bit output port 73-1, providing data over interconnection fabric 23 to another APC or SPU in processor 40; (b) 16-bit bus portions 73-2 and 73-5, providing the 16 MSBs and 16 LSBs of the data bus; and (c) address buses 73-3 and 73-4, providing 16-bit addresses for read and write accesses to SRAM sections 32-2 and 32-1, respectively.

As shown in FIG. 1E, cross-bar switch network 80-2 share the following input ports with cross-bar switch network 80-1: (a) constant 70-1, holding 16 bits of zero; (b) 16-bit bus portions 70-2 and 70-3, receiving the 16 most significant bits (MSBs) and the 16 least significant bits (LSBs) of a data bus, respectively; (c) 16-bit control bus 70-4; and (d) 16-bit input port 70-5, receiving data over interconnection fabric 23 from another APC or SPU of processor 40. In addition, cross-bar switch network 80-2 includes input ports 71-2, which receives 4 16-bit words from the 4 output ports of address iterator array 81-2.

As shown in FIG. 1E, register file 34 may be organized into separately addressable flop matrices 32-1 and 32-2. Each of flop matrices 32-1 and 32-2 may be further organized as a linear array of individually addressable registers or a 2-dimensional matrix of individually addressable registers. The output ports of cross switch network 80-2 are: (a) 16-bit output ports 72-1 and 72-2, providing an address for reading from one of the registers in flop matrix 34-1 and an address for writing into another one of the registers in flop matrix 34-1, respectively; and (b) 16-bit output ports 72-3 and 72-4, providing an address for reading from one of the registers in flop matrix 34-2 and an address for writing into another one of the registers in flop matrix 34-2, respectively.

Figures 1, 1F:
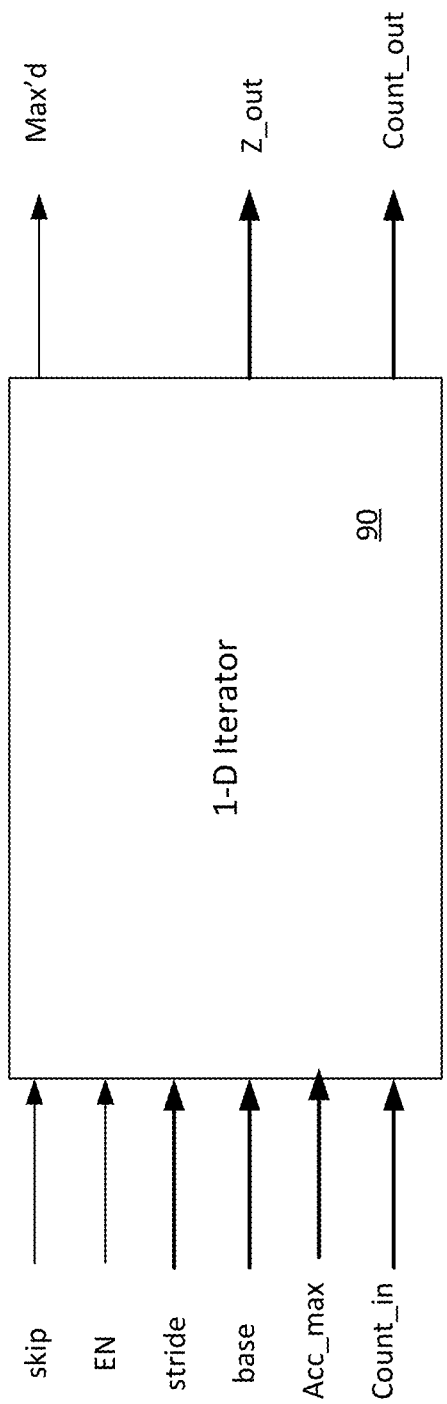
Figures 1, 1F, 2:
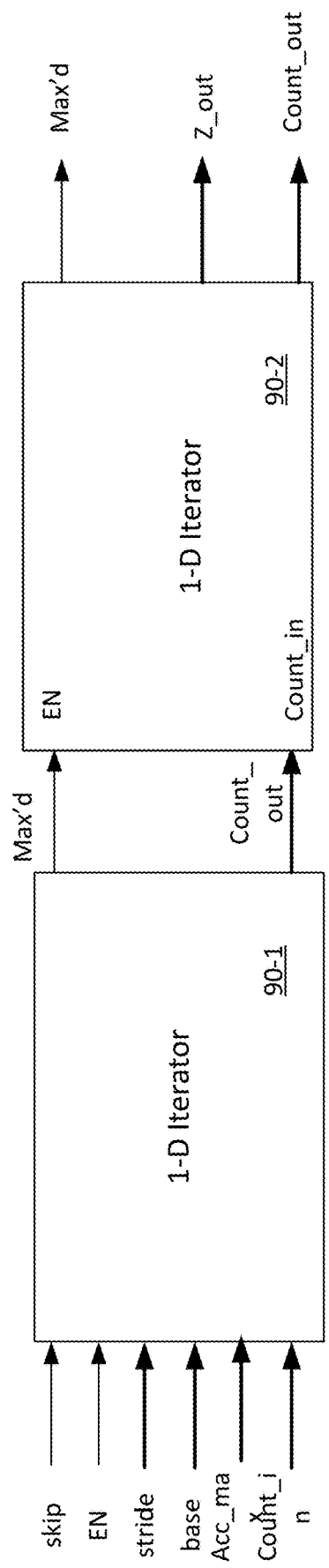

According to one embodiment one embodiment of the present invention, a generator that generates algorithmically a sequence of addresses for reading or writing data of a data structure stored in SRAM module 32 or flop matrices of register file 34 may be composed from one or more building-block address iterator circuits. FIG. 1F-1 illustrates a functional description of building block iterator circuit 90 (also referred to as "1-Dimensional (1-D) iterator" circuit 90), in accordance with one embodiment of the present invention. As shown in FIG. 1F-1, 1-D iterator circuit 90 receives as input 8-bit numerical value stride (or offset), acc_max, and count_in, 16-bit numerical value base, and 1-bit logic values EN and skip, and provides as output 16-bit numerical values z_out, 8-bit numerical value count_out, and 1-bit logic value max'd. Numerical value z_out may be used as a 16-bit memory address. In this embodiment, in each clock cycle, 1-D iterator circuit 90 operates as follows:

(a) logic value max'd is asserted when numerical values count_out and acc_max are equal;

(b) when logic values max'd and EN are both asserted, numerical value count_out is set to 0; otherwise (i) if logic value EN is asserted, numerical value count_out is set to the sum of numerical values count_in and stride; (ii) if logic value EN is not asserted, numerical value count_out is set to numerical value count_in; and (c) if logic value skip is asserted, numerical value z_out is set to numerical value base; otherwise, numerical value z_out is set to the sum of numerical values base and count_out.

The logic circuitry supporting this operation may be automatically synthesized, for example, from a register-transfer level hardware description (e.g., Verilog), as known to those of oridinary skill in the art. In essence, 1-D iterator circuit 90 is provides a memory or register address z_out that is based on base address base and an offset value count_out, count_out being a count accumulated in an internal counter, which is incremented or decremented by numerical value stride in each clock cycle. Numerical value count_in sets the initial offset at the beginning of count accumulation. 1-D iterator circuit 90, for example, may be used to access elements of a two-dimensional matrix one element at a time in a row-major or column-major manner by suitably setting numerical values base, count_in and stride. 1-D iterator circuit 90 may also be used to generate an address sequence to access the transpose of the matrix. Numerical value count_out resets to 0 when it equals numerical value acc_max.

According to one embodiment of the present invention, two or more 1-D iterator circuits may be chained to extend the generated address sequence to a higher-dimensional matrix. FIG. 1F-2 shows chaining two 1-D iterator circuits 90-1 and 90-2, according to one embodiment of the present invention. In FIG. 1F-2, 1-D iterator circuits 90-1 and 90-2 each store one dimension of a higher-dimensional data structure. Output logic signal max'd of 1-D iterator circuit 90-1 is provided as input logic signal EN in 1-D iterator circuit 90-2. In this configuration, the elements of the higher-dimensional matrix in first and second dimensions are stored in the address spaces covered by 1-D iterator circuits 90-1 and 90-2 respectively. (The address space in each 1-D iterator circuit spans between base address base and address base+acc_max). The address sequence initially traverses the address space covered by 1-D iterator circuit 90-1, providing output addresses from 1-D iterator circuit 90-1 at numerical value z_out_1. After traversal of the address space covered by 1-D interactor circuit 90-1 is complete, 1-D iterator circuit 90-1 asserts output logic value max'd, which is provided to 1-D iterator circuit 90-2 as input logic value EN. With logic value EN asserted, the address sequence traverses the address space covered by 1-D iterator circuit 90-2, providing the next addresses in the address sequence from numerical output value z_out_2.

Operations of addressor module 38 may be controlled clock cycle-by-clock cycle and synchronized through a program instruction executed in APC controller 31, in conjunction with the operations of timing belt module 36. Consequently, the memory circuits (e.g., in SRAM module 32 and register file 34) may be accessed for reading or writing operation according to the generated address sequence. Address sequence may also be paused or resumed on a clock cycle-by-clock cycle basis. Thus, addressor module 38 provides the hardware to facilitate highly complex, structured computational processes to be programmed.

To achieve power efficiency, timing signal clock is separately gated at each APC (e.g., according to the dynamic clock-gating scheme). Within each APC, local SRAM circuits 32, the registers in register file 34, circuits in addressor module 38 are active only when timing signal clock is allowed to propagate. When an APC is not processing data, timing signal clock is often not propagated for power consideration. In one embodiment, gating of timing signal clock is controlled by one or more registers ("clock-gating registers") in registers and logic circuits 15, where appropriate, under a static clock-gating scheme and, in each APC, by APC controller 31, through register files 32 and logic circuits 33, under a dynamic gating scheme. Even though timing signal clock may not be propagating in an APC, the contents of SRAM circuits 32 and register file 34 are held. In addition, some embodiments may implement in processor 40 a light sleep mode, a deep sleep mode, a powered down, or any combinations of these modes known to those skill in the art. SRAM circuits 32 may serve as local memory to support logic circuits 33 and may be shared with other APCs within SPU 45 and other SPUs in processor 40 over memory bus 20.

In addition, each APC includes a set of task-specific operators within logic circuits 33 that can be connected serially to form an execution pipeline, which performs a programmable sequence of arithmetic or logic operations data without intervention by either APC controller 31 or the host processor. The data may come into the execution pipeline as a data stream over the configured interconnection fabrics (i.e., interconnection fabric 16 and interconnection fabric 26), or retrieved from the local memory of the APC (i.e., SRAM module 32 and register file 34). At predetermined points during the computation on the pipeline (e.g., completion), APC controller 31 interrupts the host processor. The host processor may retrieve, for example, the results of the execution pipeline from the local memory over the AHB-Lite bus.

A proprietary minimal-instruction set APC controller 31 has the advantage of greater power efficiency over a commercially available microprocessor or controller (e.g., a RISC-V processor). The power efficiency results from, firstly, the task-specific operators on each APC may be optimized for the desired operations of the target application. For example, in a navigation application, optimized operations may be designed for calculating correlations between a digitized global navigation satellite system (GNSS) signal and a peak signal-to-noise ratio (PSNR) bitstream. Secondly, the execution pipeline may process data either directly from the external RF channels, or from data in its local memory. The execution pipeline is designed to process long sequences of data without intervention by the host processor. In other words, when the operators are optimized to the nature of the data in the target application, a locality of computation cam be achieved in the architecture of the present invention, leading to a much higher performance than is possible under a commercial processor. Without the ability to exploit the locality of data, a commercial processor is often bogged down by the frequent data accesses to data (e.g., the RF signals) in the memory over the system bus.

In some embodiments, each APC may configure both the interconnection fabrics at the baseband module level and at the SPU module level (i.e., both interconnection fabric 16 and interconnection fabric 26). In those embodiments, when an SPU and an APC both to configure the interconnection fabric, the SPU may yield. In this manner, each APC may reconfigure the interconnection fabric within its APC, and the interconnection fabric at the baseband level interconnection ports of its SPU to during the operations of the execution pipeline.

Processor 40 of FIG. 1B, including SPUs 14-1 to 14-4 and each SPU's associated APCs (e.g., APCs 24-1 to 24-4 of FIG. 1B), may operate under the static clock gating scheme. Under the static gating scheme, one or more clock signals are gated directly by a gating circuit to processor 40, each SPU, and each APC. Each gating circuit is controlled by an associated top-level configuration register (e.g., one of registers 15) which is set by the host processor (CPU/DMAC) prior to APC controller execution and remains unchanged until the APC controller execution completes. In one embodiment, SPUs and APCs do not have access to or control over registers 15. In one implementation, the configuration of the gating circuits is provided in fields of a 32-bit word of a SPU-level configuration register. Under this arrangement, an external host processor may initiate operations of multiple APCs concurrently in a single cycle by writing the 32-bit word over AHB interface 10 into the configuration register.

In one embodiment, the dynamic clock gating scheme is provided in each APC to synchronize the clock signals that are applied to the APC's registers 34, logic circuits 33, and timing belts 35. In one embodiment, memory bus 20, SRAM circuits 32, register file 34, addressor module 38, logic circuits 33, timing belt module 35, and APC controller 31 in each APC operate under the static clock-gating scheme. The dynamic clock gating scheme in each APC is controlled by one or more pre-specified signals sent over signal buses or cross-bar switches (e.g., cross-bar switches of interconnection fabric 26) of the configurable pipeline fabric (PLF). In general, the pre-specified signals are generated by an upstream APC. The dynamic clock gating scheme allows the associated gating circuits to be switched between active and inactive states cycle-by-cycle. Thus, the dynamic clock gating scheme provides a powerful additional synchronization mechanism. In one embodiment, APC controller 31 of each APC may override the dynamic clock-gating scheme by setting an instruction bit at the execution of a "start_timing_belt" instruction. The start_timing_belt instruction is described in further detail below.

As mentioned above, each APC may include APC controller 31 that is implemented as a programmable processor executing a relatively simple instruction set. In one embodiment, the APCs in an SPU are implemented structurally identical—but individually configurable—to facilitate performing different configurable functions by suitably connecting multiple task-specific operators in logic circuits 33. The task-specific operators may each be configured to perform one or more specific arithmetic or logic operations. These operators may take operands from either register file 34 or SRAM circuits 32 and may write back results into either register file 34 or SRAM circuits 32. Furthermore, the operators may be configured into a data processing pipeline (i.e., an execution pipeline). SPU 45 may extend the execution pipeline by connecting it with other execution pipelines configured within SPU 45. At the top level, one or more execution pipelines of each SPUs in processor 40 may also be connected to execution pipelines of other SPUs in processor 40.

Some task-specific operators, and their interconnections within the APC (i.e., with the first and second interconnectivity elements), may be configured as needed to any of multiple pre-set configurations. For example, during operation of an execution pipeline, under control of a state machine (e.g., timing belt module 35, discussed in further detail below), an operator and its interconnections may be reconfigured among its pre-set configurations. The configurations may be stored, for example, in lookup-tables and selected by control vectors programmed into configuration registers. For example, timing belt module 35 may issue the control vectors cycle-by-cycle, such that the interconnections of an operator may be changed on a cycle-by-cycle basis, thus allowing high flexibility in constructing complex streaming calculations.

According to one embodiment of the present invention, timing belt module 35 of each APC may include programmable circuits for configuring one or more sequencers, each sequencer implementing a state machine for controlling an execution pipeline in the APC. In one embodiment, the programming circuits in timing belt module 35 include at least two types of building blocks: (a) holders; and (b) passers. Each instance of each building block includes an internal counter. A holder building block is provided to represent a state in the state machine. In the normal course, each state is associated with a control vector that represents the values of all control signals provided to control the execution pipeline configured in logic circuits 33, including controlling the task-specific operators therein. A passer building block is provided to implement an iterative loop encompassing two or more states in the state machine.

Figure 2A:
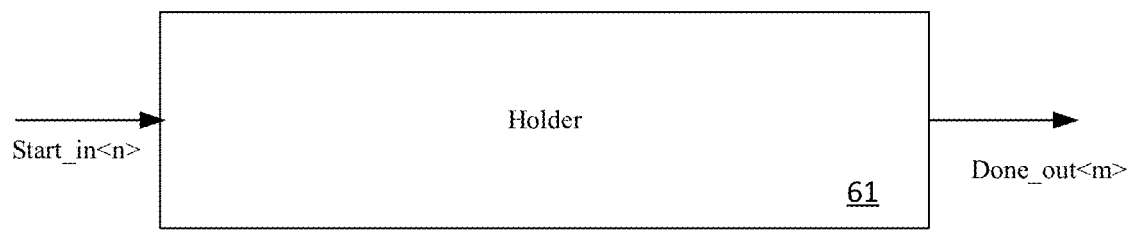
FIG. 2A illustrates holder 61, which is a representative holder building block, according to one embodiment of the present invention.

FIG. 2A illustrates holder 61, which is a representative holder build block, according to one embodiment of the present invention. Holder 61 may receive up to n start signals at its input terminals start_in<n>. Initially, the counter in holder 61 is configured to a target counter value. When holder 61 detects an assertive state (e.g., a logic "high" pulse or a logic "low" pulse, depending on the signal convention adopted) during any clock cycle at any one of terminals start_in<n>, holder 61 is activated. One of ordinary skill in the art would appreciate the metaphorical phrase "passing a token" to holder 61 as descriptive of the event of providing holder 61 the assertive state. Upon activation, holder 61's internal counter keeps tracks of the number of cycles of signal clock that elapsed since holder 61 received the token. When the number of cycles reaches the target counter value, each of output terminals Done_out<m> is provided an assertive state, to indicate that that holder 61 has held the token for the configured target counter value of clock cycles. Some holders or passers have only a single Done_out output terminal, which may fan-out to multiple input terminals.

Figure 2B:
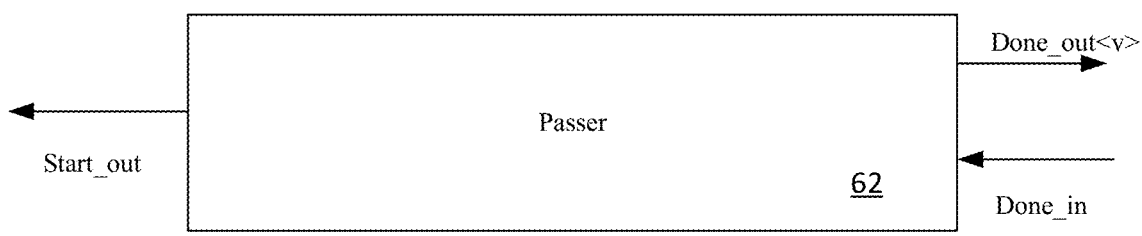
FIG. 2B shows passer 62, which is a representative passer build block, according to one embodiment of the present invention.

FIG. 2B shows passer 62, which is a representative passer build block, according to one embodiment of the present invention. Passer 62 may receive a start signal received at input terminal Done_in. Initially, passer 62 is configured to a target counter value. When passer 62 detects an assertive state (e.g., a logic "high" pulse or a logic "low" pulse, depending on the signal convention adopted) at terminal done_in, holder 62 is activated. Again, one of ordinary skill in the art would appreciate the metaphorical phrase "passing a token" to passer 62 as descriptive of the event of providing passer 62 the assertive state. Passer 61's internal counter keeps track of the number of times passer 62 is passed the token. At activation and thereafter, each time passer 62 is passed the token, passer 62 passes the token immediately over output terminal start_out (i.e., provides the assertive state on output terminal start_out) until the number of times passer 62 is passed the token reaches the target counter value. When the target counter value is reached, passer 62 passes the token to each of its output terminals Done_out<v> (i.e., provides an assertive state at each of the v output terminals Done_out<v>).

Figure 2C:
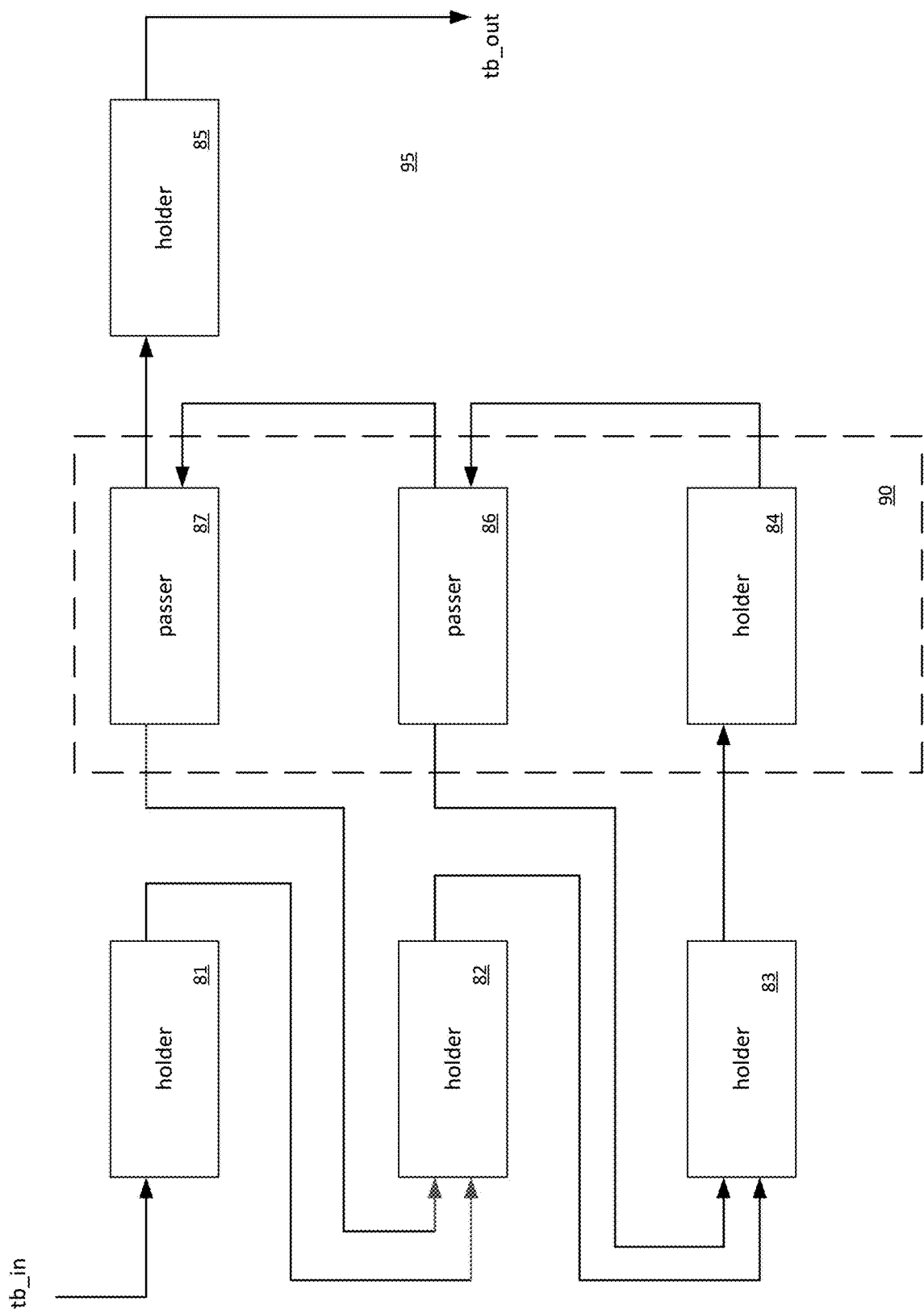
FIG. 2C illustrates sequencer 95 implementing a state machine using the holder and passer building blocks, according to one embodiment of the present invention.

FIG. 2C illustrates sequencer 95 (or, equivalently, "timing belt module 95") implementing a state machine using the holder and passer building blocks, according to one embodiment of the present invention. As shown in FIG. 2C, sequencer 95 implements a state machine that includes states $S_1$, $S_2$, $S_3$, $S_4$ and $S_5$, represented by holders 81, 82, 83, 84 and 85, respectively. Sequencer 95 implements two loops in the state machine using passers 85 and 86. Specifically, passer 86 implements a loop involving iterations of the sequence of state $S_3$, followed by state $S_4$, states $S_3$ and state $S_4$ being implemented by holders 83 and 84, respectively. Passer 86 iterates this sequence a number of times represented by its target counter value. Likewise, passer 87 iterates its configured target counter value the nested loop involving the sequence of state $S_2$ and the $S_3$-$S_4$ loop implemented by passer 86. As shown in FIG. 2C, the token is first passed into sequencer 95 at input terminal tb_in of holder 81, and the token eventually is passed out of sequencer 95 at terminal tb_out of holder 85. Thus, sequencer 95 implements the state machine $a*S_1+b*(c*S_2+d*(e*S_3+f*S_4))+g*S_5$, where a, c, e, f and g are the respective target counter values configured in holders 81, 82, 83, 84 and 85, respectively, and b and d are the target counter values configured in passers 86 and 87, respectively. Note that frequently used combination of passers and holders may be preconfigured or pre-formed building blocks. For example, FIG. 2C shows pre-formed, custom building block 90, which includes a combination of one or more passers and one or more holders configurable for implementing the specific combination of holder 84 and passers 86 and 87. The text expression defining the state machine $a*S_1+b*(c*S_2+d*(e*S_3+f*S_4))+g*S_5$ is in a format that allows a simple computer program to parse and automatically generate the connected combination of passers and holders that implements the sequencer. Creating such a program is within the skill of one of ordinary skill in the art. Cross-bar switches may be used to configure connections among the basic building blocks (e.g., a combination of two holders and one passer) to form frequently used combinations. Some implementations may not even require any higher-level pre-formed blocks (e.g., hard-coded state machine). The resulting high degree of configurability enables timing belt 35 to control complex streaming pipelines. Furthermore, the ease of configuration through programming cross-bar switches allows introduction of additional pre-formed elements simply by software or firmware updates.

Once configured, computations on a large amount of data (e.g., a large array of signal samples or any intermediate data sets) may be carried out during data processing operations under a sequencer—an example of the functions of timing belt module 35—of the present invention, without intervention by APC controller 31, any of the SPUs, or the host processor. In one embodiment, to activate an execution pipeline, a token is passed into the associated sequencer of the execution pipeline, concurrently with activating distribution of timing signal clock into the execution pipeline (e.g., through the static clock-gating scheme programmed into configuration registers in the SPU-level). Execution pipelines of multiple APCs, whether within the same SPU or across SPUs) may be synchronized using a barrier mechanism.

According to one embodiment of the present invention, barrier controller 17 is provided at the top-level of processor 40, as shown in FIG. 1A. Barrier controller 17 implements two or more barriers, each barrier having a barrier counter (e.g., up to the total number of APCs in processor 40). Each counter in barrier controller 17 is assigned a barrier_id. Each barrier is assigned a different barrier_id than the barrier_id of any of the other barriers. Execution pipelines that are required to be synchronized with each other at the beginning of execution are identified, grouped and assigned to the same barrier (i.e., assigned to the same barrier_id). In one embodiment, the execution pipelines waiting on the same barrier are execution pipelines from different APCs. At the time of execution pipeline configuration, the number of execution pipelines waiting on the same barrier is determined and that number is used as the target counter value for the barrier. The configured target counter values may be stored, for example, in one of the top-level registers in processor 40.

When an execution pipeline in an APC is ready for execution, its corresponding APC controller (e.g., APC controller 31 of APC 48 of FIG. 1B) sends to barrier controller 17 the barrier_id of the barrier to which the execution pipeline is assigned to wait on. The request may be implemented by writing into an assigned "barrier count" register in top-level registers 15 of processor 40. When barrier controller 17 has received the request of the last one of the APCs waiting on the barrier (i.e., the number of requests equals the configured target counter value for that barrer_id), barrier controller 17 sends a barrier_release signal to each APC waiting on the barroer_id simultaneously. The barrier_release signal may be implemented, for example, by barrier controller 17 writing into a SPU-level register. When APC controller 31 receives the barrier_release signal, a token is passed into the sequencer of the corresponding execution pipeline immediately to initiate execution of that execution pipeline without delay. Since the barrier_release signal is sent to all the waiting APCs simultaneously, the execution pipelines of all the APCs waiting on that barrier are synchronized to begin execution simultaneously. In one embodiment, the clock-gating register in each SPU is also written into to enable propagation of timing signal clock to simultaneously enable the task-specific operators of the execution pipeline and their respective related circuitry.

Two APCs connected by interconnection fabric (e.g., within interconnection fabric 26, or through the combination of interconnection fabric 26 and interconnection fabric 16) may synchronize their execution pipelines using the send_pulse and the wait_pulse instructions. APC controller 31 of one APC may suspend its execution pipeline by executing a wait_pulse instruction until it receives a corresponding code word from APC controller 31 of another APC executing the send_pulse instruction. Executing a send_pulse instruction writes a one-cycle vector (i.e., the corresponding code word) to the input internal data bus of the recipient APC over the relevant interconnection fabric. The one-cycle vector links the pair of send_pulse and wait_pulse instructions. In one embodiment, the one-cycle vector is 28-bit word and may encode configuration information to be exchanged between the APCs. The programs in the APCs should be carefully constructed such that wait_pulse instruction is executed prior to the corresponding send_pulse instruction is executed.

Any portion of an execution pipeline in an APC may be constructed by appropriately configuring interconnection fabric 26 or interconnection fabric 16. Data may be sourced, for example, from a data stream that over interconnection fabric 26, from local SRAM circuits 32, or from register file 34. Once a pipelined computation is complete, APC controller 31 may assert an interrupt to the host processor, which may then retrieve over AHB interface 10 by a memory read request that directs APC 48 to transfer the results of the pipelined computation from SRAM 32 over memory bus 20.

With the task-specific operators in logic circuits 33 tailored to allow configurations for performing a set of special purpose functions (e.g., calculating correlation and processing global navigational satellite system (GNSS) signals and peak signal-to-noise PSNR bitstreams), processor 40 provides a programmable power-efficient baseband processor. Furthermore, each APC in processor 40 may operate an execution pipeline that continuously processes long sequences of data received either directly from an RF channel or from its local memory (e.g., SRAM circuits 32), without intervention from the host processor, thereby achieving much greater efficiency than baseband processors of the prior art. In addition, during data processing operations, each APC of processor 40 may access and configure interconnection fabric 16 and interconnection fabric 26, thereby allowing the APC to affect or change its execution pipeline configuration involving other APCs, directly, or through the additional input and output ports of its SPU. In some embodiments, multiple processors, each similarly configured as processor 40, may operate together. In those configurations, each processor may likewise affect or change execution pipeline configurations among themselves.

In some embodiments, top-level registers 15 and SPU-level registers 25 may be mapped to a first region in a memory address space of the host processor. Likewise, the local SRAM circuits in the APCs may be mapped to a second region in the same memory address space of the host processor. Register file 34 in each APC may also be mapped to the same first region or to a separate region in the host processor's address space, as appropriate.

From the point of view of the host processor, processor 40 may be viewed as having three operational stages: (i) APC programming stage, (ii) APC running stage, and (iii) a result-fetching stage. In one embodiment, during the APC programming stage, the host processor loads instructions for each APC into SRAM circuits (e.g., SRAM module 32) accessible by that APC. A control circuit in each APC (e.g., APC controller 31) executes the loaded instructions. Those instructions include instructions for loading a bit stream into configuration registers associated with the execution pipeline, thereby configuring that portion of the execution pipeline.

In the APC running stage, the configured execution pipeline processes the data streams flowing into the execution pipelines (e.g., the digital samples from the RF signal source). Note that more than one execution pipeline may be configured and operated concurrently. At the completion of pipeline execution or under certain predetermined conditions, processor 40 asserts an interrupt signal to the host processor to indicate termination of the APC running stage. The host processor then initiates the result-fetching stage to retrieve the results of the computations in the execution pipeline, or to examine any exception conditions encountered in processor 40, as appropriate. Upon completion of the result-fetching stage, the host processor may initiate the next computational cycle by initiating another APC programming stage. In some embodiments, for each APC that is to be programmed, participate in pipeline execution, or provide results, the host processor (i) may write into the clock-gating registers at the beginning of the stage—to activate the APC for the intended operation, and (ii) may write into the clock-gating registers at the end of the stage to deactivate the APC.

During the APC programming stage, the host processor programs the computation tasks to be carried out on processor 40. In particular, task-specific operators in each APC may be configured into an execution pipeline, the execution pipelines of the APCs in each SPU may be connected to form one or more extended pipelines. Likewise, the extended pipelines of the SPUs may also be connected with extended execution pipelines of other SPUs. Data processing operations in each APC of processor 40 are controlled by APC controller 31, which executes a sequence of instructions written into SRAM module 32 of the APC to carry out its control functions. APC controller 31's instruction set may include instructions for (i) data transfer among SRAM circuits 32 and register file 34, (ii) transfer of control (e.g., jump or branch instructions, including conditional transfers of control); (iii) raising an interrupt signal to the host processor; (iv) resetting state elements in logic circuits 33; (v) setting interconnection fabric 26 and interconnection fabric 16; (vi) arithmetic and logic instructions; and (vii) a synchronized beginning of execution in the APC for an execution pipeline. The synchronized beginning of execution of an execution pipeline may be initiated by the "start_timing_belt" instruction.

At the beginning of the APC running stage, the host processor configures interconnections among the SPUs and the APCs in interconnection fabric 16 or interconnection fabric 26, by appropriately writing into interconnection configuration registers in top-level registers 15 or the SPU-level registers 25. The interconnections in these interconnection fabrics may be fixed interconnections between SPUs and APCs (i.e., interconnections that stay unchanged throughout the APC running stage) or dynamically switched interconnections that may be effected by one or more APCs during the APC running stage. The host processor then sets a reset vector for each APC by writing into the reset vector registers in the top-level registers. A reset vector is a 16-bit address that is mapped to the location in SRAM circuits 32 of the first instruction in the program to be executed by APC controller 31 during the APC running stage.

The host processor then allows the APC controllers to run their respective programs by writing into a trigger register in top-level registers 15 of processor 40. In one embodiment, the trigger register is a 32-bit register, capable of supporting up to 32 APCs, with each bit being dedicated to a corresponding one of the implemented APCs. In one embodiment, a '1' in the corresponding bit in the trigger register signals that the APC is to be activated. Thus, all the activated APC are synchronized at the beginning of their respective executions. Synchronization of beginning of execution in execution pipelines of APCs within the same SPU or across SPUs is accomplished through the start_timing_belt instruction.

In one embodiment, for power conservation reasons, prior to APC controller 31 in each APC executes a start_timing_belt instruction, as in the normal course, the operators and associated circuits of the execution pipeline in logic circuits 32 are not active, as propagation of signal clock is normally disabled by the clock-gating register. When APC controller 31 executes the start_timing_belt instruction, a barrier_id specified in the instruction is sent to barrier controller 17 to indicate that the execution pipeline in the APC is ready and waiting for the barrier corresponding to the barrier_id, except when the instruction specifies a zero value for the barrier_id. When the barrier_id is zero-value, no waiting at a barrier is required, and APC controller 31 allows the execution pipeline to begin execution immediately. Beginning of execution may be effectuated, for example, by passing a token into the execution pipeline. See, e.g., the example of FIG. 2C, in which beginning of execution is accomplished by passing a token at input terminal tb_in of sequencer 95.

When the last one of the APCs waiting at the barrier corresponding to barrier_id arrives at barrier controller 17, barrier controller 17 sends a barrier_release signal to each of the waiting APCs simultaneously. At each APC controller, at the beginning of the next cycle of timing signal clock, the execution pipeline begins execution. Beginning of pipeline execution may be accomplished, for example, by passing a token into the corresponding sequencer. See, e.g., FIG. 2C illustrates beginning pipeline execution by passing a token at input terminal tb_in of sequencer 95. Thus, synchronized beginning of execution of all the execution pipelines waiting at the barrier of the barroer_id is achieved. In one embodiment, the start_timing_belt instruction may specify that APC controller 31 allows a specified number of cycles of timing signal clock to be enabled prior to waiting at the specified barrier. These pre-execution cycles of timing signal clock allow final initialization of the execution pipeline before execution.

In the normal course, as illustrated by FIG. 2C, when pipeline execution completes, for example, the token is passed out of output terminal tb_out of sequencer 95. In one embodiment, the start_timing_belt instruction completes when pipeline execution completes (e.g., the token is passed out of output terminal tb_out, as illustrated in FIG. 2C). In one embodiment, however, a pre-mature termination of the execution pipeline may be allowed (e.g., due to an exception condition). The premature termination may cause the start_timing_belt instruction to complete pre-maturely. In one embodiment, at the completion of the start_timing_belt instruction, whether in the normal course or prematurely, the start_timing_belt instruction may specify a number of cycles of timing signal clock be allowed to propagate in logic circuits 33 after instruction completion. These post-completion cycles allow APC controller 31 to prepare the execution pipeline into an orderly state. Such an orderly state may allow recovery from the exception condition. For example, APC controller 31 may be able to restart of the execution pipeline from the orderly state, if desired.

Upon completion of each pipeline execution, a send_interrupt instruction may cause the APC controller of an APC in the execution pipeline to raise an interrupt signal, which may be accomplished, for example, by setting a corresponding bit in an interrupt register in top-level registers 15. In some instances, a second interrupt register in top-level registers 15 may be provided, in which the interrupt bit of each APC is written after gating by a corresponding bit in a mask register. After the last one of the APCs completes execution, the trigger register is reset and the host processor is interrupted according to the value held in the interrupt register. The host processor then examines the interrupt register to determine that state of each APC at the respective completions of execution of their execution pipelines.

In the normal course, at the completion of its pipeline execution, an APC writes the result of its data processing into SRAM circuits 32. In some instances, the results may be input to a subsequent execution pipeline to be operated on the same or another APC. When all computational tasks are complete, the host processor may read the final results from processor 40. Such final results may be, for example, a mere single word, or any number of words. The final results may be provided at the local SRAM module 32 of a designated APC or distributed across SRAM modules in numerous APCs.

Figure 3A:
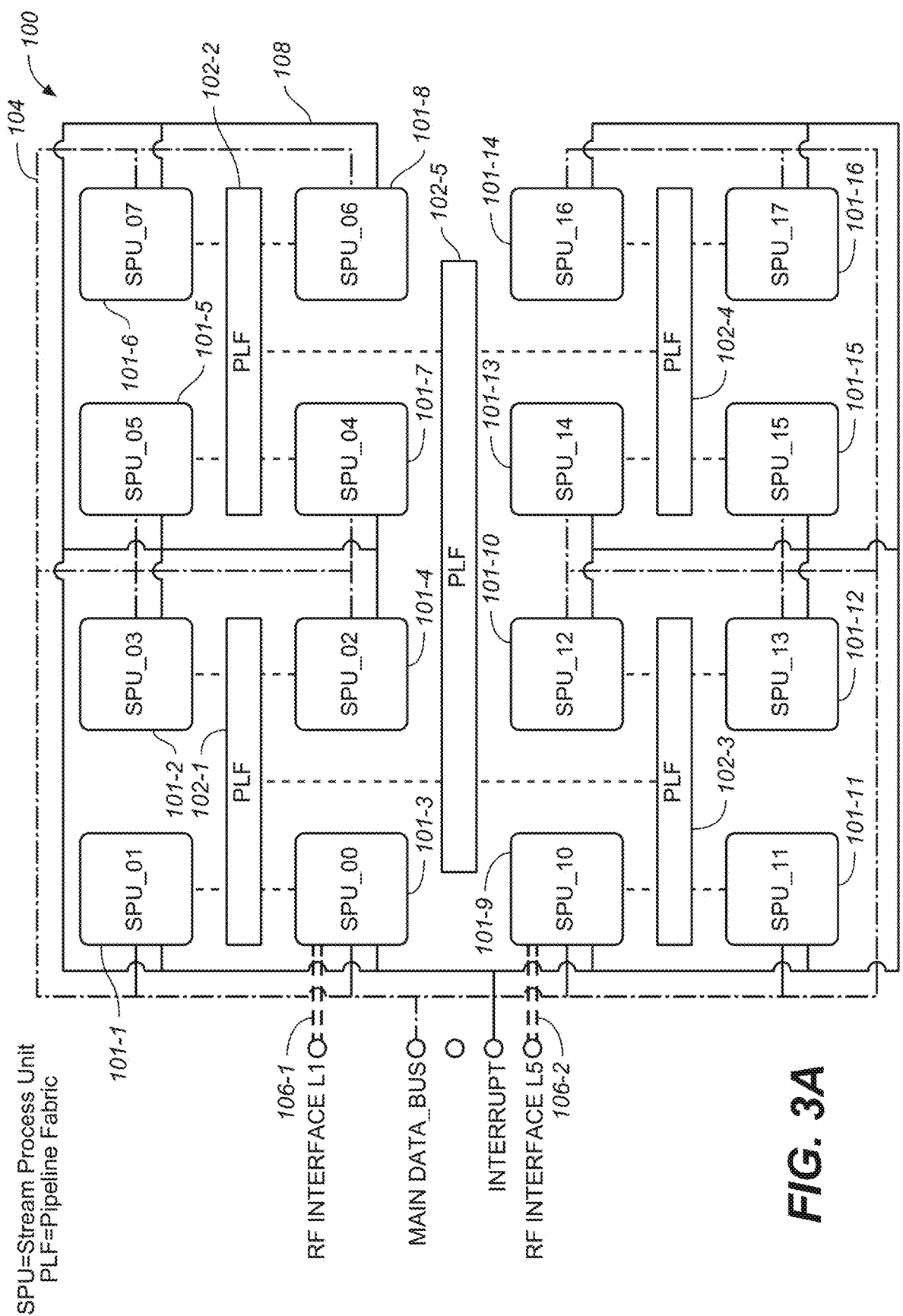
FIG. 3A shows processor 100 that includes a 4×4 array of stream processing units (SPUs), e.g., SPUs 101-1, 101-2, 101-3, . . . , and 101-16, according to one embodiment of the present invention.

According to one embodiment of the present invention, FIG. 3A shows a processor 100 that includes, for example, a 4×4 array of SPUs, e.g., SPUs 101-1, 101-2, 101-3, . . . , and 101-16, according to one embodiment of the present invention. Of course, the 4×4 array is selected for illustrative purpose in this detailed description. A practical implementation may have any number of SPUs. The SPUs are interconnected among themselves by configurable pipeline fabric (PLF) 102—e.g., a form of interconnect fabric 16 of FIG. 1A—that allow computational results from a given SPU to be provided or "streamed" to another SPU. With this arrangement, the 4×4 array of SPUs in processor 100 may be configured at run time into one or more groups of SPUs, with each group of SPUs configured as pipeline stages for a pipelined computational task.

In the embodiment shown in FIG. 3A, PLF 102 is shown to include PLF unit 102-1, 102-2, 102-3 and 102-4s, each may be configured to provide data paths among the four SPUs in one of four quadrants of the 4×4 array. PLF units 102-1, 102-2, 102-3 and 102-4 may also be interconnected by suitably configuring PLF unit 102-5, thereby allowing computational results from any of SPUs 101-1, 101-2, 101-3, . . . , and 101-16 to be forwarded to any other one of SPUs 101-1, 101-2, 101-3, . . . , and 101-16. In one embodiment, the PLF units of processor 100 may be organized in a hierarchical manner. The organization shown in FIG. 1 may be considered a 2-level hierarchy with PLF 102-1, 102-2, 102-3 and 102-4 forming one level (e.g., akin to interconnection fabric 16 of SPU module 13 in FIG. 1A) and PLF 102-5 being a second level (e.g., akin to interconnection fabric 26 of APC module 23 in FIG. 1B). In this embodiment, a host CPU (not shown) may configure and reconfigure processor 100 over global bus 104 in real time at appropriate times during an operation. For example, during an operation that requires reconfiguring an APC, a send_interrupt instruction causes the APC controller to send an interrupt to the host processor, which causes the host processor to effectuate the reconfiguration and to reset and to reinitiate the APC. Global bus 104 may be implemented as part of or as an extension of AHB interface 10. Interrupt bus 105 is provided to allow each SPU to raise one or more interrupts to the host CPU to indicate task completion or any of numerous exceptional conditions. Input data buses 106-1 and 106-2 stream input data into processor 100.

In one data processing application for satellite-based navigation, processor 100 may serve as a digital baseband circuit that processes in real time digitized samples from a radio frequency (RF) front-end circuit. In that application, the input data samples received into processor 100 at input data buses 106-1 and 106-2 are in-phase and quadrature components of a signal received at an antenna, after signal processing at the RF front-end circuit. The received signal includes the navigation signals transmitted from numerous positioning satellites.

Figure 3B:
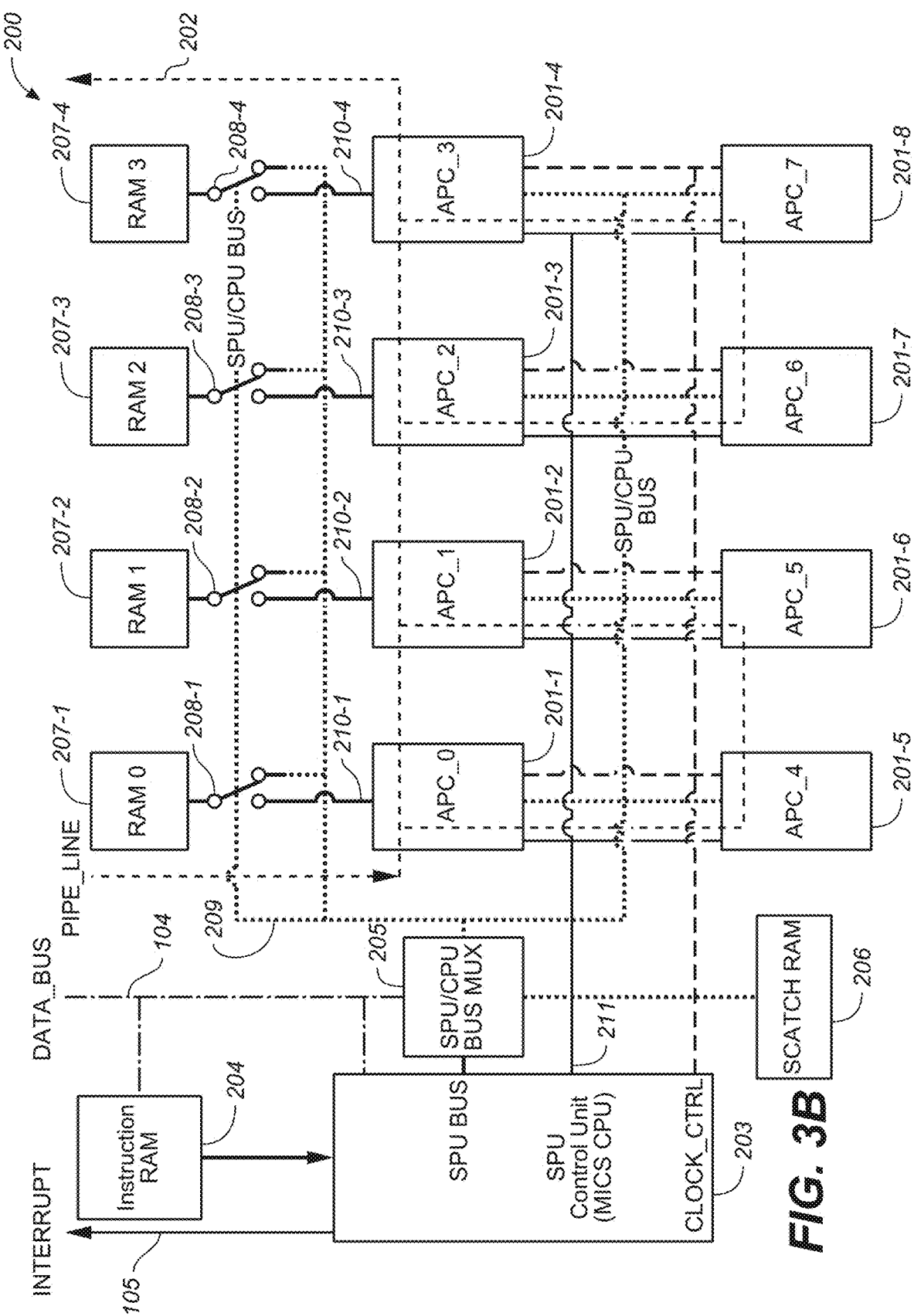
FIG. 3B shows SPU 200 in one implementation of an SPU in processor 100 of FIG. 1, according to one embodiment of the present invention.

FIG. 3B shows SPU 200 in one implementation of an SPU in processor 100, according to one embodiment of the present invention. As shown in FIG. 3B, SPU 200 includes 2×4 array of arithmetic and logic units, with each arithmetic and logic unit of the array serving as APC 45 of FIG. 1-D. As described above, (i) each APC is reconfigurable via a set of configuration registers for any of numerous arithmetic and logic operations; and (ii) the APCs may be configurable in any of numerous manners to stream results any APC to another APC in SPU 200. As shown in FIG. 3B, APCs 201-1, 201-2, . . . , 201-8 in the 2×4 array of APCs in SPU 200 are provided data paths among themselves on PLF subunit 202, which is an extension from its corresponding PLF unit 101-1, 101-2, 101-3 or 101-4.

As shown in FIG. 3B, SPU 200 includes control unit 203, which executes a small set of instructions from instruction memory 204—e.g., akin to a portion of SRAM module 32 in APC 48 of FIG. 1-D—which is loaded by host CPU over global bus 104. Internal processor bus 209 is accessible by host CPU over global bus 104, during a configuration phase, and by control unit 203 during a computation phase. Switching between the configuration and computational phases is achieved by an enable signal (e.g., a trigger signal in the trigger register) asserted from the host CPU. When the enable signal is de-asserted, any clock signal to an APC—and, hence, any data valid signal to any operator with the APC—is gated off to save power. Any SPU may be disabled by the host CPU by gating off the power supply signals to the SPU. In some embodiments, power supply signals to an APC may also be gated. Likewise, any PLF may also be gated off, when appropriate, to save power.

The enable signal to an APC may be memory-mapped to allow it to be accessed over internal process bus 209. Through this arrangement, when multiple APCs are configured in a pipeline, the host CPU or SPU 200, as appropriate, may control enabling the APCs in the proper order—e.g., enabling the APCs in the reverse order of the data flow in the pipeline, such that all the APCs are ready for data processing when the first APC in the data flow is enabled.

Multiplexer 205 switches control of internal processor bus 209 between the host CPU and control unit 203. SPU 200 includes memory blocks 207-1, 207-2, 207-3 and 207-4, which are accessible over internal processor bus 209 by the host CPU or SPU 200, and by APC 201-1, 201-2, . . . , 201-8 over internal data bus during the computation phase.

Switches 208-1, 208-2, 208-3 and 208-4 each switch access to memory blocks 207-1, 207-2, 207-3 and 207-4 between internal processor bus 209 and a corresponding one of internal data bus 210-1, 210-2, 210-3 and 210-4. During the configuration phase, the host CPU may configure any element in SPU 200 by writing into configuration registers over global bus 104, which is extended into internal processor bus 209 by multiplexer 205 at this time. During the computation phase, control unit 203 may control operation of SPU 200 over internal processor bus 209, including one or more clock signals that that allow APCs 201-1, 201-2, . . . , 201-8 to operate synchronously with each other. At appropriate times, one or more of APCs 201-1, 201-2, . . . , 201-8 may raise an interrupt on interrupt bus 211, which is received into SPU 200 for service. SPU may forward the interrupt signals and its own interrupt signals to the host CPU over interrupt bus 105. Scratch memory 206 is provided to support instruction execution in control unit 203, such as for storing intermediate results, flags and interrupts. Switching between the configuration phase and the computation phase is controlled by the host CPU.

In one embodiment, memory blocks 207-1, 207-2, 207-3 and 207-4 are accessed by control unit 203 using a local address space, which may be mapped into an allocated part of a global address space of processor 100. Configuration registers of APCs 201-1, 201-2, . . . , 201-8 are also likewise accessible from both the local address space and the global address space. APCs 201-1, 201-2, . . . , 201-8 and memory blocks 207-1, 207-2, 207-3 and 207-4 may also be directly accessed by the host CPU over global bus 104. Setting multiplexer 205 through a memory-mapped register, the host CPU can connect and allocate internal processor bus 209 to become part of global bus 104.

Control unit 203 may be a microprocessor of a type referred to by those of ordinary skill in the art as a minimal instruction set computer (MISC) processor, which operates under supervision of the host CPU. In one embodiment, control unit 203 manages lower-level resources (e.g., APC 201-1, 201-2, 201-3 and 201-4) by servicing certain interrupts and by configuring locally configuration registers in the resources, thereby reducing the supervisory requirements of these resources on the host CPU. In one embodiment, the resources may operate without participation by control unit 203, i.e., the host CPU may directly service the interrupts and the configuration registers. Furthermore, when a configured data processing pipeline requires participation by multiple SPUs, the host CPU may control the entire data processing pipeline directly.

Figure 3C:
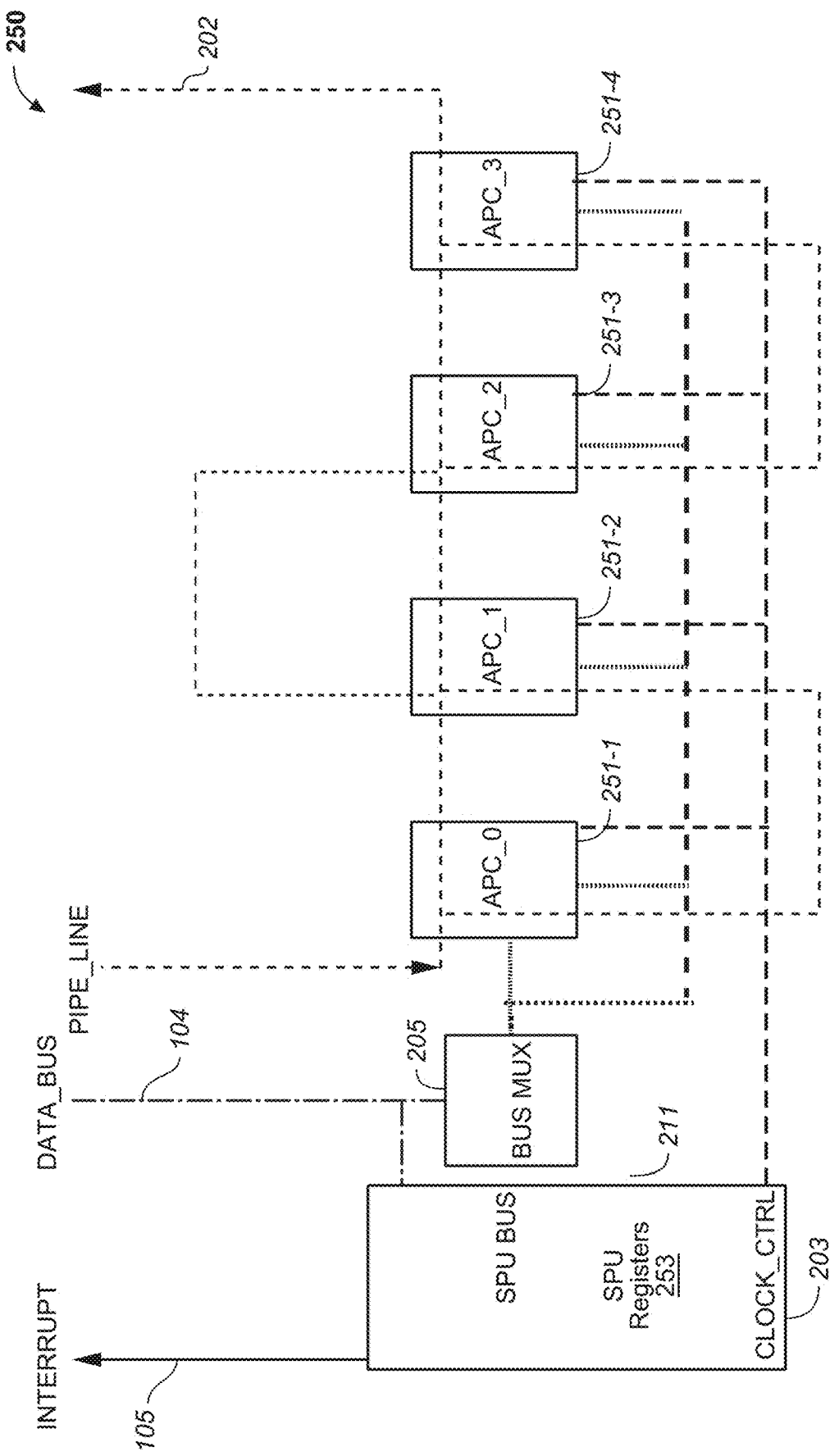
FIG. 3C shows SPU 250 in another implementation of an SPU in processor 100 of FIG. 1, according to one embodiment of the present invention.

FIG. 3C shows SPU 250 in another implementation of an SPU in processor 100 of FIG. 1, according to one embodiment of the present invention. In SPU 250, relative tio SPU 200 of FIG. 3B, only APCs 251-1 to 251-4 are provided. Likewise, memory blocks 207-1 to 207-4 are also not implemented, their functions being performed at the APC level (e.g., SRAM module 32 of FIG. 1C-1). Also. SPU control unit 203 of FIG. 3B is not implemented, its functions being provided by the k-controller (e.g., APC controller 31 of FIG. 1B) at the APC-level. SPU registers 253 provides configuration and control registers at the SPU level, supporting dynamic configuration and coordinating operations across APC 251-1 to 251-4.

Figure 4A:
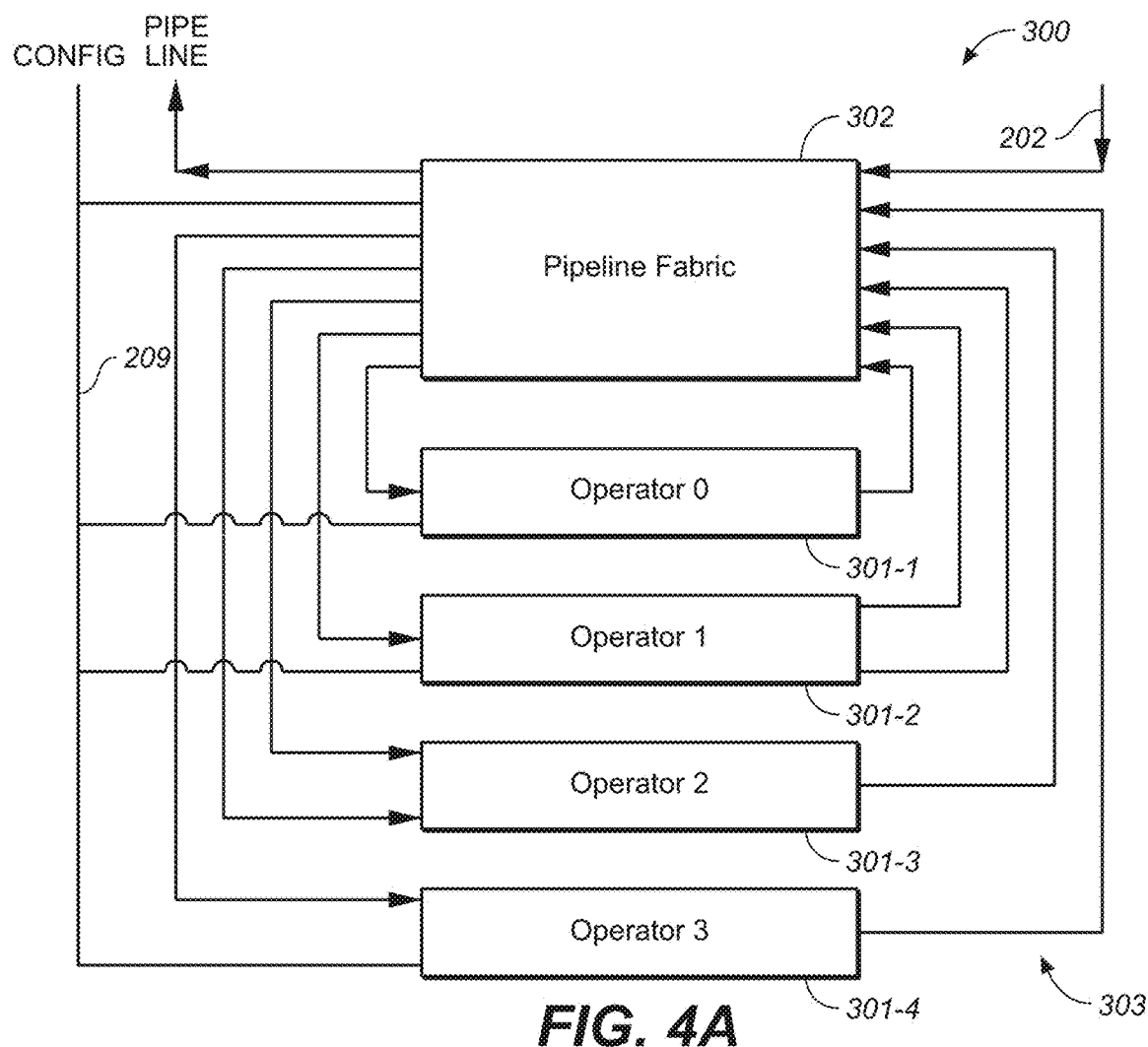
FIG. 4A shows APC 300 in one implementation of one of APC 201-1, 201-2, 201-3 and 201-4 of FIG. 3B, according to one embodiment of the present invention.

FIG. 4A shows APC 300 in one implementation of one of APC 201-1, 201-2, 201-3 and 201-4 of FIG. 2, according to one embodiment of the present invention. As shown in FIG. 4A, for illustrative purpose only, APC 300 includes representative operator units 301-1, 301-2, 301-3, and 301-4. Each operator unit may include one or more arithmetic or logic circuits (e.g., adders, multipliers, shifters, suitable combinational logic circuit, suitable sequential logic circuits, or combinations thereof). APC PLF 302 allows creation of data paths 303 among the operators in any suitable manner by the host CPU over internal processor bus 209. APC PLF 302 and operators 301-1, 301-2, 301-3 and 301-4 are each configurable over internal processor bus 209 by both the host CPU and control unit 203, such that the operators may be organized to operate on the data stream in a pipeline fashion.

Figure 4B:
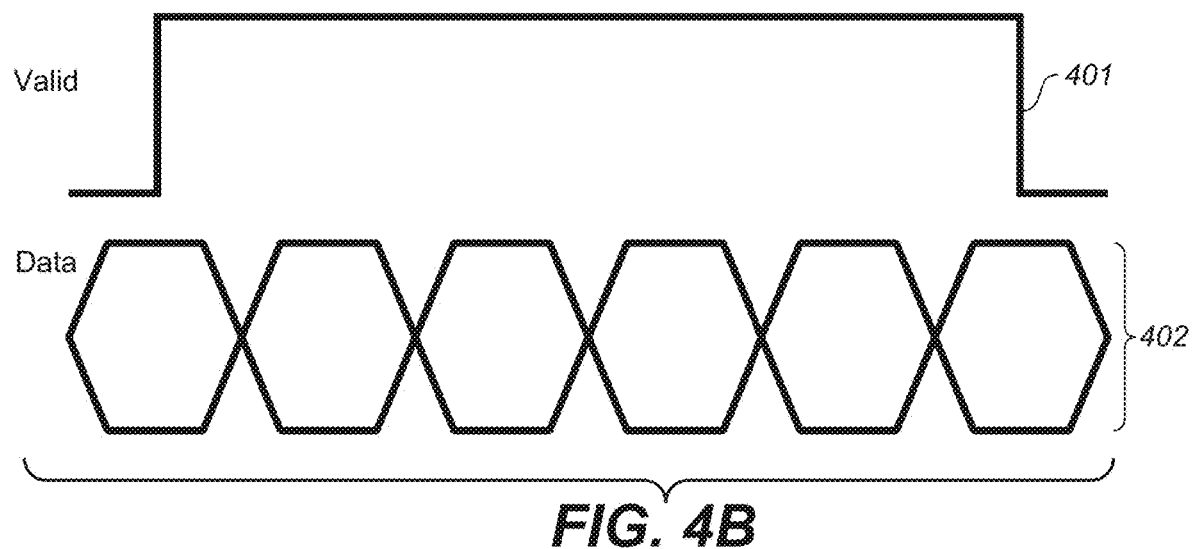
FIG. 4B shows an enable signal generated by each operator to signal that its output data stream is ready for processing by the next operator.

Within a configured pipeline, the output data stream of each operator is provided as the input data stream for the next operator. As shown in FIG. 4B, valid signal 401 is generated by each operator to signal that, when asserted, its output data stream (402) is valid for processing by the next operator. An operator in the pipeline may be configured to generate an interrupt signal upon detecting the falling edge of valid signal 401 to indicate that processing of its input data stream is complete. The interrupt signal may be serviced by control unit 203 or the host CPU. Data into and out of APC 300 are provided over data paths in PLF subunit 202 of FIG. 3B.

Some operators may be configured to request data from an associated memory block (i.e., memory blocks 207-1, 207-2, 207-3 or 207-4). For example, one operator may receive data from the associated memory block and may write the data onto its output data stream into the pipeline. One operator may read data from its input data stream in the pipeline and send data to be written into the associated memory block. Some operators may require data from the RF digital data stream (e.g., over RF interfaces 106-1 and 106-2; see, FIG. 3A). In some embodiments, an operator does not directly access the memory units. Instead, built-in memory access circuits ("address generators") in logic circuits 33 are provided to enable the required data access. In one embodiment, these address generators may be implemented, for example, by 1-D iterators described above. The address generators may be configured to generate a linear stream of addresses. Multiple address generators may be configured to manage more complex memory access patterns. Address generators and operators are typically configured together to operate under control of timing belt 35. In each cycle that requires a read-access to a memory unit, the memory unit accepts an address from an address generator, and returns the data read for use by the operator. An address generator may provide a stream of addresses for sequentially read accesses to a memory unit in multiple cycles. In that operation, the memory addresses and the resulting data are provided in a 2-stage pipeline. In a write access to a memory unit, the address generator provides both the memory address and the data to be written in the same cycle.

One or more buffer operators may be provided in an APC. A buffer operator may be configured to read or write from a local buffer (e.g., a FIFO buffer). When congestion occurs at a buffer operator, the buffer operator may assert a pause signal to pause the current pipeline. The pause signal disables all related APCs until the congestion subsides. The buffer operator then resets the pause signal to resume the pipeline operation.

In one embodiment, specialized memory or register circuits ("flop matrices") may be provided in addition to the memory blocks (e.g., memory blocks 207-1 to 207-4), or as part of the memory blocks. Each flop matrix is organized as n rows×m columns of memory words, with access ports optimized for accessing the memory words by "row" or by "column." These flop matrices are particularly useful when data, state information and configuration information can be modeled and manipulated using matrix operations.

Figure 5:
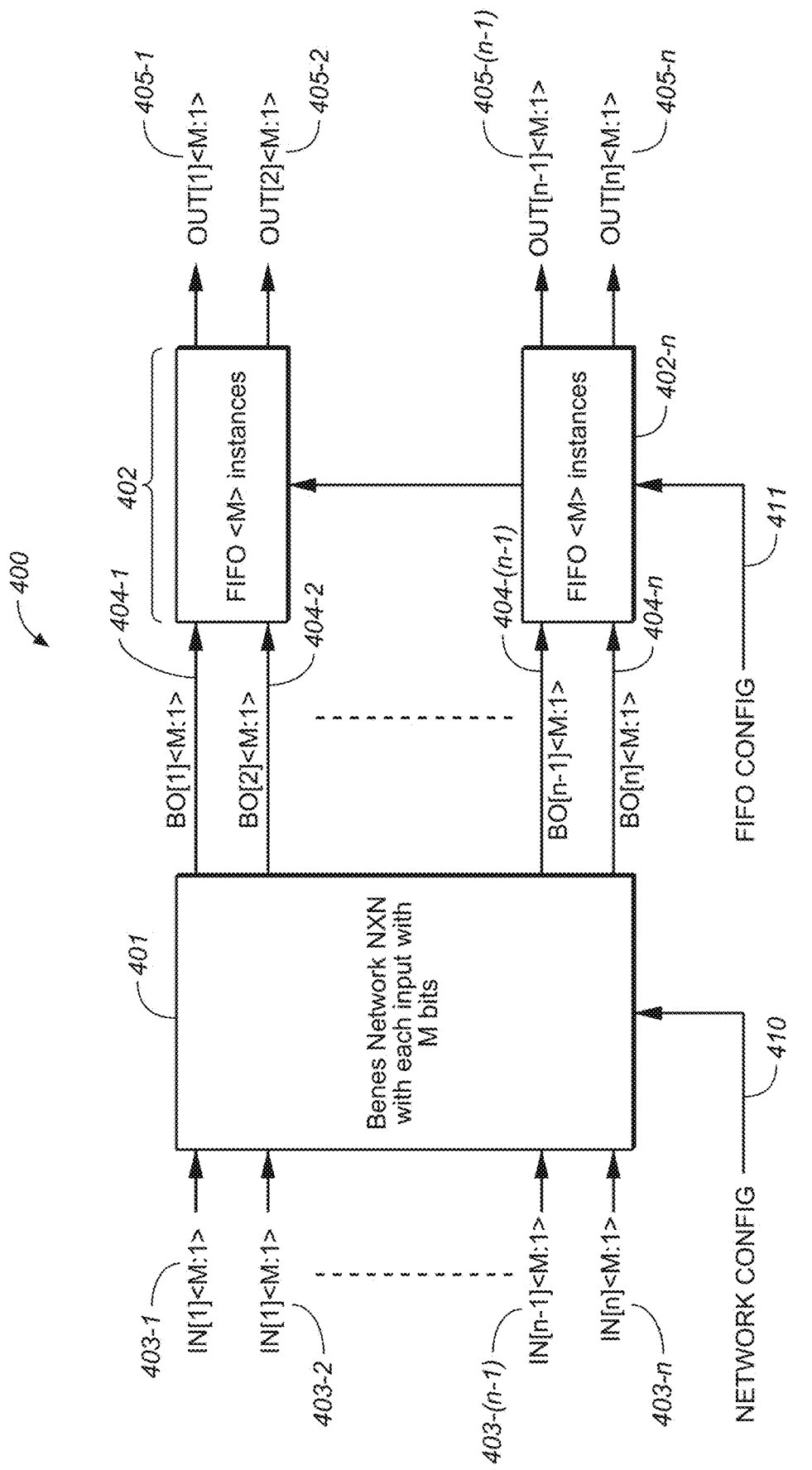
FIG. 5 shows a generalized, representative implementation 400 of any of PLF unit 102-1, 102-2, 102-3, and 102-4 and PLF subunit 202, according to one embodiment of the present invention.

FIG. 5 shows a generalized, representative implementation 400 of any of PLF unit 102-1, 102-2, 102-3, and 102-4 and PLF subunit 202, according to one embodiment of the present invention. As shown in FIG. 5, PLF implementation 400 includes Benes network 401, which receives n M-bit input data streams 403-1, 403-2, . . . , 403-$n$ and provides n M-bit output data streams 404-1, 404-2, . . . , 404-$n$. Benes network 401 is a non-blocking n×n Benes network that can be configured to allow the input data streams to be mapped and routed to the output data streams stream in any desired permutation programmed into its configuration register. Output data streams 404-1, 404-2, . . . , 404-$n$ are then each provided to a corresponding configurable first-in-first-out (FIFO) register in FIFO registers 402, so that the FIFO output data streams 405-1, 405-2, . . . , 405-$n$. are properly aligned in time for their respective receiving units according to their respective configuration registers. Control buses 410 and 411 represents the configuration signals into the configuration registers of Benes network 401 and FIFO registers 402, respectively.

The above detailed description is provided to illustrate specific embodiments of the present invention and is not intended to be limiting. Numerous modifications and variations within the scope of the invention are possible. For example, memory units at the APC-level (e.g., memory units 207-1 to 207-4 of FIG. 3B) are each dedicated to use by a corresponding one of the APCs, thus eliminating the need for a cross-APC memory bus (e.g., internal process bus 209) for simplified and less costly design. The present invention is set 5 forth in the accompanying claims.

We claim:

1. A programmable data processor, comprising a plurality of programmable pipeline circuits, each programmable pipeline circuit comprising:
   (1) a plurality of arithmetic and logic operator circuits, each arithmetic or logic circuit being configurable to carry out a selected one of a plurality of predetermined arithmetic or logic functions on a set of one or more operands to provide a set of one or more results;
   (2) a plurality of programmable interconnection elements, configurable to connect a selected group of the arithmetic and logic operator circuits to form an execution pipeline in which the set of results of a first member of the selected group is provided as part of the set of operands of a second member of the selected group, wherein operations in the execution pipeline are controlled according to a state machine; and
   (3) a plurality of building block circuits connectable to each other using the programmable interconnection elements, to allow a collection of the building block circuits to form one or more sequencers within the state machine, the building block circuits comprising (i) a plurality of state elements, each configurable for representing a state in the state machine, and (ii) a plurality of loop elements, each configurable for representing a loop in the state machine, wherein (i) each state element keeps track of a programmable duration for which the sequencer is to remain in the state represented by the state element, and (ii) each loop element keeps track of a number of iterations for which the sequencer is to traverse the loop represented by the loop element; and
   (b) a control circuit that initiates operation of each sequencer.

2. The programmable data processor of claim 1, wherein the control circuit of a first one of the programmable pipeline circuits enters a first state in which the first pipeline circuit suspends execution of its execution pipeline or execution pipelines until a second one of the programmable pipeline circuits enters a second state, in which the second programmable pipeline circuit sends a predetermined vector.

3. The programmable data processor of claim 1, wherein the predetermined vector links the first state and the second state.

4. The programmable data processor of claim 1, further comprising a barrier controller circuit for providing a synchronizing signal to allow the control circuit of a first one of the programmable pipeline circuits and the control circuit of a second one of the programmable pipeline circuits to initiate operations of their respective state machines simultaneously.

5. The programmable data processor of claim 4, wherein the programmable pipeline circuits are organized into a plurality of groups, each group of the programmable pipeline circuits further comprising a stream processor, and wherein the stream processors are interconnected to each other by a plurality of stream processor-level programmable interconnection elements.

6. The programmable data processor of claim 5 wherein, within each group of programmable pipeline circuits, the execution pipeline of a first one of the programmable pipeline circuits is connected to the execution pipeline of a second one of programmable pipeline circuits by configuring their respective interconnection elements.

7. The programmable data processor of claim 5 wherein, between a first group of programmable pipeline circuits, a first one of the programmable pipeline circuits in the first group is connected to the execution pipeline of a programmable pipeline circuits of the second group by configuring both their respective interconnection elements and the stream-processor level interconnection elements.

8. The programmable data processor of claim 5, wherein both the first programmable pipeline circuit and the second programmable pipeline circuit are within the same group of the programmable pipeline processors.

9. The programmable data processor of claim 5, wherein the first programmable pipeline circuit is part of a first one of the groups of programmable pipeline circuits and wherein the second programmable pipeline circuit is part of a second one of the groups of programmable pipeline circuits.

10. The programmable data processor of claim 4, wherein the barrier controller implements a plurality of barriers, each barrier is associated with a predetermined number of programmable pipeline circuits allowed to wait on the barrier.

11. The programmable data processor of claim 1, wherein the programmable data processor provides a periodic timing signal serving each group of programmable pipeline circuits, wherein the predetermined duration is specified by a number of cycles in the periodic timing signal.

12. The programmable data processor of claim 11, wherein each programmable pipeline circuit further comprises a gating circuit for the timing signal, the gating circuit selectively enabling and disabling propagation of the timing signal among the programmable arithmetic or logic operator circuits.

13. The programmable data processor of claim 1, wherein each programmable pipeline circuit further comprises a plurality of registers for storing the operands and the results.

14. The programmable data processor of claim 13, wherein each programmable pipeline circuit further comprises a memory circuit for storing the operands and the results.

15. The programmable data processor of claim 14, wherein the control circuit of each programmable pipeline circuit executes a program stored in the memory circuit, the program comprising instructions of a common instruction set.

16. The programmable data processor of claim 15, wherein the common instruction set includes a wait instruction to be executed by a control circuit of a first one of the programmable pipeline circuits and a release instruction to be executed by a second one of the programmable pipeline circuits, wherein upon executing the wait instruction, the first programmable pipeline circuit enters a first state in which the first pipeline circuit suspends execution of its execution pipeline or execution pipelines until the second programmable pipeline circuit executes the release instruction whereby the second programmable pipeline circuit sends a predetermined vector.

17. The programmable data processor of claim 14, wherein the common instruction set comprises instructions for data transfers between the registers and the memory.

18. The programmable data processor of claim 1, further comprising an interface with an external host processor.

19. The programmable data processor of claim 18, further comprising a first plurality of configuration registers accessible to the external host processor, the configuration registers being provided for the external host processor to configure the execution pipeline in each programmable pipeline circuit in the programmable data processor.

20. The programmable data processor of claim 1, further comprises a plurality of look-up tables, each designated for storing a configuration of the programmable interconnection elements, wherein the control circuit retrieves one or more of the configurations from the look-up tables to configure the programmable interconnection elements.

21. The programmable data processor of claim 1, wherein the programmable pipeline circuit further comprises:
- a memory circuit having a plurality of independently accessible first and second memory portions, each memory portion holding data words in locations that the data words are individually addressable using a designated address in a linear address space;
- first and second address generation circuits each receiving an enable signal, a base address and an increment, each address generation circuit further comprising a counter circuit that (i) holds a count value which is incremented by the offset at each cycle of the clock signal; and (ii) sums the incremented count value to the base address to form a generated address; and
- a first cross-bar switch network configurable at each cycle of the clock signal to route the generated address of each addressable generation circuit to one of the memory portions; and
- wherein the control circuit executes a sequence of instructions that (i) configures the cross-bar switch network, selecting at least one of the memory sections to receive the generated address of one of the address generation circuits, and (ii) asserts the enable signal of at least one of the address generation circuits.

* * * * *